US012008642B1

(12) United States Patent
Perelli-Minetti et al.

(10) Patent No.: US 12,008,642 B1
(45) Date of Patent: Jun. 11, 2024

(54) ELECTRONIC PAYROLL FUNDS TRANSFER DELAY AND FAILED TRANSFER COVERAGE

(71) Applicant: Block, Inc., San Francisco, CA (US)

(72) Inventors: Linnea Perelli-Minetti, New York, NY (US); Caroline Hollis, San Francisco, CA (US); Theodore Kosev, Seattle, WA (US); Connor H. Dunn, San Francisco, CA (US); Emily McLinden, San Francisco, CA (US)

(73) Assignee: BLOCK, INC., Oakland, CA (US)

( * ) Notice: Subject to any disclaimer, the term of this patent is extended or adjusted under 35 U.S.C. 154(b) by 0 days.

(21) Appl. No.: 17/845,130

(22) Filed: Jun. 21, 2022

Related U.S. Application Data

(62) Division of application No. 15/995,039, filed on May 31, 2018, now Pat. No. 11,379,913.

(51) Int. Cl.
*G06Q 40/03* (2023.01)
*G06Q 40/12* (2023.01)
*G06Q 40/02* (2023.01)

(52) U.S. Cl.
CPC .......... *G06Q 40/03* (2023.01); *G06Q 40/125* (2013.12); *G06Q 40/02* (2013.01)

(58) Field of Classification Search
None
See application file for complete search history.

(56) References Cited

U.S. PATENT DOCUMENTS

| 6,938,008 | B1 | 8/2005 | Stokes |
| 6,941,281 | B1 | 9/2005 | Johnson |
| 7,630,932 | B2 | 12/2009 | Danaher et al. |
| 8,204,779 | B1 | 6/2012 | Hughes et al. |
| 9,727,912 | B1 | 8/2017 | Poursartip et al. |
| 9,892,458 | B1 | 2/2018 | Shearer et al. |

(Continued)

FOREIGN PATENT DOCUMENTS

WO 2008/150243 A2 12/2008

OTHER PUBLICATIONS

"Report Information from Dialog", Dialog (Jul. 3, 2021), pp. 1-30.
(Continued)

*Primary Examiner* — William J Jacob
(74) *Attorney, Agent, or Firm* — MATTINGLY & MALUR, PC

(57) ABSTRACT

One or more processors receive, from a payroll application, payroll data specifying employment and payroll information associated with an employer. The payroll application is associated with a payment service. Transaction data is received specifying payments between one or more customers and the employer. A trained model is used to generate a risk score based at least in part on the payroll data and the transaction data, the model having been trained using past payroll data and past transaction data associated with a plurality of merchants. Based at least in part on determining that the risk score satisfies a threshold, an instruction is sent to cause the payroll application to present an interface element in a user interface of the payroll application, Selection of the interface element triggers a delay of an electronic withdrawal of funds from the employer account from a first date to a later date.

20 Claims, 10 Drawing Sheets

(56) References Cited

U.S. PATENT DOCUMENTS

| | | |
|---|---|---|
| 10,007,953 B1 | 6/2018 | Nathoo et al. |
| 10,019,698 B1 * | 7/2018 | Scott .................... G06Q 20/145 |
| 10,180,781 B2 | 1/2019 | Shah et al. |
| 10,445,716 B1 | 10/2019 | Riechers et al. |
| 10,453,086 B1 | 10/2019 | Scott et al. |
| 10,534,511 B2 | 1/2020 | Garcia |
| 10,535,054 B1 | 1/2020 | Sptizer |
| 10,628,816 B1 | 4/2020 | Scott et al. |
| 10,692,140 B1 | 6/2020 | Kim et al. |
| 10,949,918 B2 | 3/2021 | Fidanza et al. |
| 11,107,157 B1 * | 8/2021 | Kerof ................ G06Q 20/4037 |
| 11,176,607 B1 | 11/2021 | Bekmann et al. |
| 11,250,503 B1 * | 2/2022 | Jew .................... G06F 3/04847 |
| 11,379,913 B1 | 7/2022 | Perelli-Minetti et al. |
| 11,580,599 B1 | 2/2023 | Kerof et al. |
| 2001/0044756 A1 | 11/2001 | Watkins et al. |
| 2003/0074311 A1 | 4/2003 | Saylors et al. |
| 2003/0163447 A1 | 8/2003 | Sandman |
| 2004/0111361 A1 | 6/2004 | Griffiths et al. |
| 2004/0225545 A1 | 11/2004 | Turner et al. |
| 2004/0225594 A1 | 11/2004 | Nolan, III et al. |
| 2005/0131843 A1 | 6/2005 | Sansone et al. |
| 2006/0015469 A1 | 1/2006 | Whitehouse |
| 2006/0161435 A1 | 7/2006 | Atef et al. |
| 2006/0242030 A1 | 10/2006 | Blanchard, Jr. et al. |
| 2007/0150387 A1 | 6/2007 | Seubert et al. |
| 2007/0271178 A1 | 11/2007 | Davis et al. |
| 2007/0288357 A1 | 12/2007 | Holman et al. |
| 2008/0027856 A1 | 1/2008 | Owens et al. |
| 2008/0243569 A1 | 10/2008 | Hadden |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0216638 A1 * | 8/2009 | Matthews ............... G06Q 20/28 705/41 |
| 2010/0100464 A1 | 4/2010 | Ellis et al. |
| 2011/0106691 A1 | 5/2011 | Clark et al. |
| 2011/0178902 A1 | 7/2011 | Imrey et al. |
| 2012/0109820 A1 | 5/2012 | Galit et al. |
| 2012/0233090 A1 | 9/2012 | Tavares et al. |
| 2013/0339219 A1 | 12/2013 | Bernheimer et al. |
| 2014/0156433 A1 | 6/2014 | Hills |
| 2014/0229397 A1 | 8/2014 | Fink |
| 2014/0258088 A1 | 9/2014 | Belarj |
| 2014/0351116 A1 | 11/2014 | Hoff |
| 2014/0358766 A1 | 12/2014 | Nayyar et al. |
| 2015/0026035 A1 | 1/2015 | Showalter |
| 2015/0039490 A1 | 2/2015 | Forrester et al. |
| 2015/0095210 A1 | 4/2015 | Grech et al. |
| 2015/0100475 A1 | 4/2015 | Cummings et al. |
| 2015/0149333 A1 | 5/2015 | Yaplee et al. |
| 2015/0193873 A1 | 7/2015 | Hammock et al. |
| 2015/0371335 A1 | 12/2015 | Liptak et al. |
| 2017/0098216 A1 | 4/2017 | Studnitzer |
| 2018/0053253 A1 | 2/2018 | Gokhale et al. |
| 2018/0225648 A1 * | 8/2018 | Robinson ................ G06Q 20/24 |
| 2019/0095883 A1 * | 3/2019 | Robinson ................ G06Q 40/02 |
| 2019/0172155 A1 | 6/2019 | Byron et al. |
| 2020/0357051 A1 | 11/2020 | Hunt et al. |
| 2020/0357052 A1 | 11/2020 | Hunt et al. |
| 2020/0387923 A1 | 12/2020 | Mitchell |

OTHER PUBLICATIONS

Non-Final Office Action mailed Apr. 4, 2018, for U.S. Appl. No. 15/855,802, of Jew, W., et al., filed Dec. 27, 2017.
Final Office Action mailed Nov. 19, 2018, for U.S. Appl. No. 15/855,802, of Jew et al., filed Dec. 27, 2017.
Advisory Action mailed Feb. 8, 2019, for U.S. Appl. No. 15/855,802, of Jew, W., et al., filed Dec. 27, 2017.
Non-Final Office Action mailed Oct. 2, 2019, for U.S. Appl. No. 15/855,802, of Jew, W., et al., filed Dec. 27, 2017.
Final Office Action mailed Mar. 6, 2020, for U.S. Appl. No. 15/855,802, of Jew, W., et al., filed Dec. 27, 2017.
Non-Final Office Action mailed on May 15, 2020, U.S. Appl. No. 15/995,039, of Perelli-Minetti, L., et al., filed May 31, 2018.
Advisory Action mailed May 21, 2020, for U.S. Appl. No. 15/855,802, of Jew, W., et al., filed Dec. 27, 2017.
Non-Final Office Action mailed on Jun. 25, 2020, U.S. Appl. No. 15/994,882, of Kerof, V., et al., filed May 31, 2018.
Non-Final Office Action mailed Aug. 20, 2020, for U.S. Appl. No. 16/022,397, of Bekmann, J., et al., filed Jun. 28, 2018.
Non-Final Office Action mailed Oct. 7, 2020, for U.S. Appl. No. 15/855,802, of Jew, W., et al., filed Dec. 27, 2017.
Final Office Action mailed on Nov. 13, 2020, U.S. Appl. No. 15/995,039, of Perelli-Minetti, L., et al., filed May 31, 2018.
Final Office Action mailed on Jan. 6, 2021, U.S. Appl. No. 15/994,882, of Kerof, V., et al., filed May 31, 2018.
Advisory Action mailed on Feb. 18, 2021, U.S. Appl. No. 15/995,039, of Perelli-Minetti, L., et al., filed May 31, 2018.
Final Office Action mailed Mar. 26, 2021, for U.S. Appl. No. 16/022,397, of Bekmann, J., et al., filed Jun. 28, 2018.
Notice of Allowance mailed on Apr. 15, 2021, U.S. Appl. No. 15/994,882, of Kerof, V., et al., filed May 31, 2018.
Final Office Action mailed Apr. 19, 2021, for U.S. Appl. No. 15/855,802, of Jew, W., et al., filed Dec. 27, 2017.
Advisory Action mailed May 25, 2021, for U.S. Appl. No. 16/022,397, of Bekmann, J., et al., filed Jun. 28, 2018.
Notice of Allowance mailed Jul. 13, 2021, for U.S. Appl. No. 16/022,397, of Bekmann, J., et al., filed Jun. 28, 2018.
Non-Final Office Action mailed on Aug. 12, 2021, U.S. Appl. No. 15/995,039, of Perelli-Minetti, L., et al., filed May 31, 2018.
Notice of Allowance mailed Sep. 9, 2021, for U.S. Appl. No. 16/022,397, of Bekmann, J., et al., filed Jun. 28, 2018.
Advisory Action mailed Sep. 15, 2021, for U.S. Appl. No. 15/855,802, of Jew, W., et al., filed Dec. 27, 2017.
Notice of Allowance mailed Oct. 4, 2021, for U.S. Appl. No. 15/855,802, of Jew, W., et al., filed Dec. 27, 2017.
Supplemental Notice of Allowability mailed Oct. 15, 2021, for U.S. Appl. No. 16/022,397, of Bekmann, J., et al., filed Jun. 28, 2018.
Supplemental Notice of Allowability mailed Oct. 15, 2021, for U.S. Appl. No. 15/855,802, of Jew, W., et al., filed Dec. 27, 2017.
Supplemental Notice of Allowability mailed Oct. 25, 2021, for U.S. Appl. No. 15/855,802, of Jew, W., et al., filed Dec. 27, 2017.
Notice of Allowance mailed on Feb. 23, 2022, U.S. Appl. No. 15/995,039, of Perelli-Minetti, L., et al., filed May 31, 2018.
Non-Final Office Action mailed on Jun. 23, 2022, U.S. Appl. No. 17/704,153, of Kerof V., et al., filed Mar. 25, 2022.

* cited by examiner

US 12,008,642 B1

ELECTRONIC PAYROLL FUNDS TRANSFER DELAY AND FAILED TRANSFER COVERAGE

CROSS-REFERENCE TO RELATED APPLICATION

This application is a division of, and claims priority to, U.S. patent application Ser. No. 15/995,039, filed May 31, 2018, issued as U.S. Pat. No. 11,379,913, and which is incorporated by reference herein.

BACKGROUND

Payroll funds are processed in advance of when payroll is dispersed to payees. Because of the gap between when payroll is processed and payroll is dispersed, the paying business is without funds for a few days before payroll settles. This is particularly onerous for small businesses or other businesses sensitive to variations in capital. For example, to pay employees on Friday, a business must transmit the funds for payroll on the Monday prior and the funds come out of the business's bank account on Tuesday. Moreover, electronic payroll payments may fail for any of a variety of reasons (e.g., insufficient funds, transfer not authorized in time for payment to settle on pay date, service outage), leaving employees without funds owed them.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
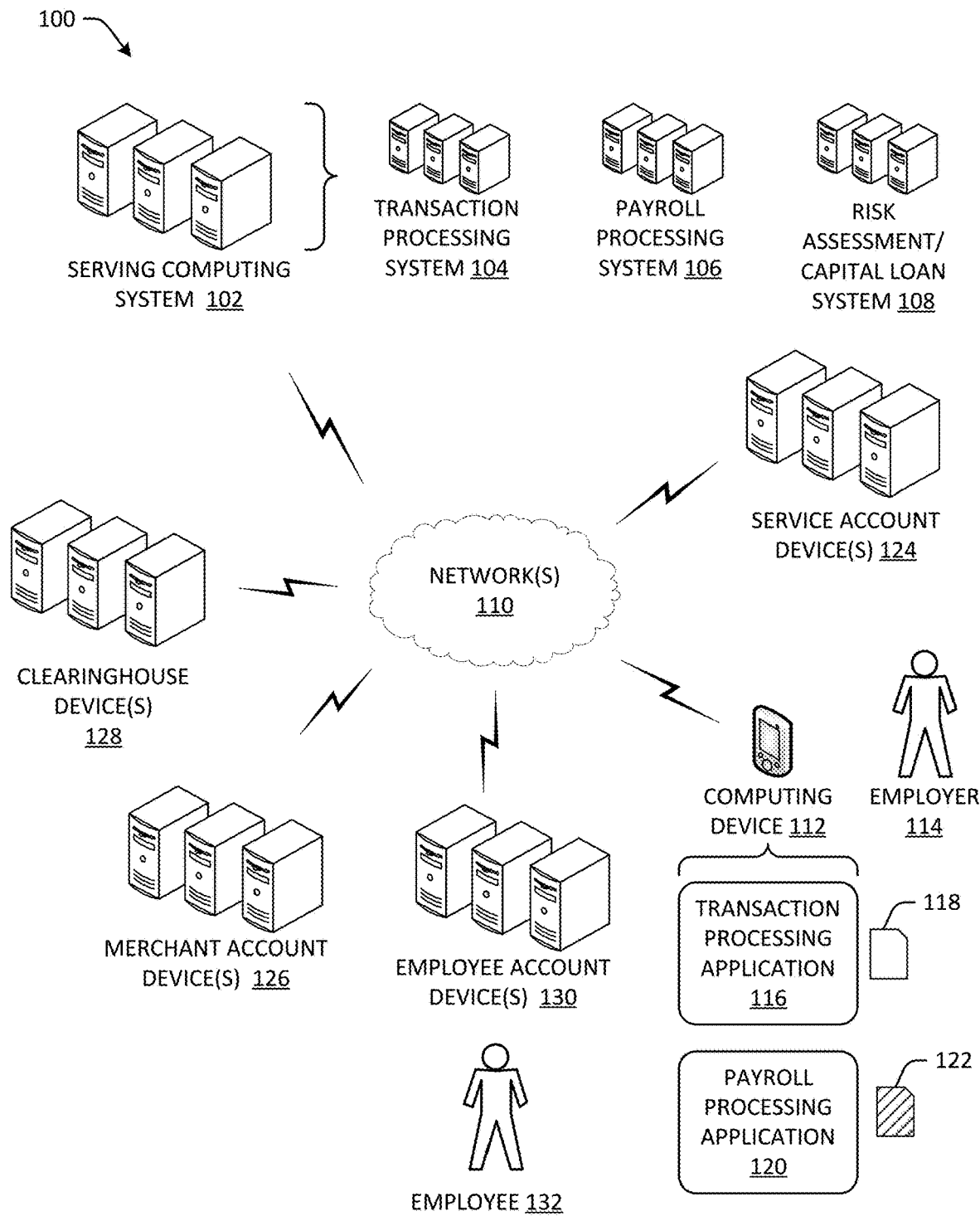
FIG. 1 illustrates a block diagram of an example environment for affecting a delay of an electronic funds transfer to satisfy a payroll payment and/or making a payroll payment via a service account in the case of an electronic payment failure (i.e., "covering" the electronic payment failure).

This disclosure is directed to techniques (e.g., machines, processes) for affecting a delay in a payroll payment and/or making a payroll payment via a service account in the case of an electronic payroll payment failure. The techniques may include identifying a subset of employer devices for which a serving computing system enables delayed payroll payment and/or failed payroll payment coverage. In some examples, the techniques may include generating a risk score from transaction data received from an instance of a transaction processing application running on an employer device and/or payroll data received from an instance of a payroll processing application running on the employer device. For example, serving computing system may include a risk assessment service that generates a risk score from transaction data, payroll data, and/or other data available to the serving computing system.

In some examples, the payroll processing service may receive a risk score corresponding to an employer and transaction data and/or employer data received from instances of the transaction processing application and payroll processing application running on the employer device. The payroll processing service may determine that the risk score meets or exceed a threshold risk score or that the risk score is less than the threshold risk score. If the payroll processing services determines that the risk score meets or exceeds the threshold risk score, the payroll processing service may transmit instructions to the instance of the payroll processing application running on the employer device that configure a user interface of the payroll processing application to populate an interface element. In a first example, where the employer has not attempted to initiate an electronic funds transfer to satisfy the payroll payment yet (e.g., which the payroll processing system may determine by querying the instance of the payroll processing application), selection of the interface element may delay the electronic funds transfer from a first date to a second date later than the first date. For example, traditionally (e.g., using an automated clearing house (ACH) transfer), in order for a payroll payment to settle by Friday, the employer must initiate the electronic funds transfer on the Monday prior with the funds traditionally being withdrawn from the employer's bank account on Tuesday. The techniques described herein cause the funds to be withdrawn on Thursday night in a same scenario where employees are to be paid on Friday.

If, for some reason, after activating the delay the electronic funds did not settle by the business day following the payment date (i.e., Monday in the example above) the payroll processing service may notify the capital loan service. In some examples, the capital loan service and/or the payroll processing service may cause an electronic funds transfer from a service account associated with the serving computing system to the employee accounts to cover the failed electronic funds transfer. The capital loan service may also activate a capital loan for the employer in an amount corresponding to the payroll payment made via the service account. In some examples, after activating the capital loan, the capital loan service and/or the transaction processing service may provide a notification to the employer device (e.g., via a user interface of the transaction processing application and/or the payroll processing application) that the capital loan has been activated and the amount is due.

In some examples, the amount transferred via the service account to cover the failed electronic funds transfer (i.e., the "covered amount"), which is also the capital loan amount, may be equal to or less than an amount specified the payroll payment (i.e., the "payroll amount"). For example, an employer may provide a selection via an interface element to have between 0% and 100% of the payroll amount covered (e.g., such as via a slider element), should the electronic transfer fail. An employer may choose 80% coverage, for example. In some examples, the risk assessment service may take this selection into account with generating the risk score. If the risk assessment service determines that an employer would qualify for less than 100% coverage, the interface element may include an indication of the portion of the payroll payment that the employer qualifies for. For example, the payroll processing service may provide instructions to the payroll processing application to display an interface element that displays a range for which the employer is qualified (e.g., the user interface may include a slider that is selectable between 0% and 80% coverage or $0 and $4,000).

In an additional or alternate example, the payroll processing service may determine that the second date has passed and/or that the employer device initiated an electronic funds transfer without having activated the interface element that affects a delay of the electronic funds transfer. In some examples, this may include the payroll processing service querying the instance of the payroll processing application to determine whether the interface element has been selected and/or receiving an indication from the payroll processing application for the payroll processing service to initiate an electronic funds transfer to make the payroll payment. In such an example, if the payroll processing service determines that the electronic funds transfer fails, the payroll processing service may provide instructions to the instance of the payroll processing application to provide a interface element via the user interface of the payroll processing application selectable to have the failed electronic payment covered by via a service account transfer and a capital loan activated. In some examples, the payroll processing service may provide instructions for this interface element to appear on the user interface of the payroll application when a risk score corresponding to the employer meets or exceeds a threshold, but to be "grayed out" until an electronic funds transfer rails, at which time the payroll processing service may provide instructions for the interface element to no longer be "grayed out," but to be selectable.

In some examples, once a capital loan has been activated, the capital loan service may notify the transaction processing service and the transaction processing service may withhold a portion of funds from subsequent transactions received from the instance of the transaction processing application to repay the capital loan. In some examples, the portion withheld may correspond to a selection of an interface element presented via the transaction processing application and/or the payroll processing application (e.g., selection of a slider that can increase or decrease the portion withheld). For example, a slider may be presented via the user interface that allows an employer to select a portion that corresponds to 15% and 100% of transactions. In some examples, the portion withheld may be a percentage of funds indicated by a transaction and/or a fixed currency amount that is set based at least in part on a type of merchant the employer is, average transaction value, etc. For example, the transaction processing service may withhold $3.00 for coffeehouse and $10.00 for a home goods store. In some examples, where the transaction value does not meet or exceed the fixed portion, the entire transaction value may be withheld (e.g., where the fixed portion is $10.00 and a transaction value is $8.38, $8.38 may be withheld). Additionally or alternatively, the portion and/or a selectable range of portions provided via the user interface may be based at least in part on a number of past failed electronic transactions, an amount of overtime indicated by the payroll data, a risk score, etc.

For example, the payroll processing service and/or transaction processing service may provide a user interface including an interface element selectable to set a withhold rate between 10% and 100% for an employer with no previous failed electronic transactions, but a withhold rate between 40% and 100% for an employer with two failed electronic transactions.

Techniques discussed herein remedy a problem that arises because of electronic funds transfers—electronic funds transfers may take a business day or more, but more commonly 3-5 business days for settlement to be accomplished, leaving business owners without access to capital for those days. This is much longer than a cash transaction. Techniques discussed herein employ a unique system of computing devices (e.g., the operations between the transaction processing service, the payroll processing service, and the risk assessment service/capital loan service (collectively, "serving computing system") and the operations of those services upon and between the instance of the transaction processing application and the instance of the payroll processing application executing on an employer device that results in delaying the electronic funds transfer up until the payroll payment date. This allows electronic funds transfers to still be used without the disadvantageous time-lag and without reverting to a different electronic funds system and/or without reverting to cash or paper check transactions.

Moreover, techniques discussed herein include controlling an employer device via instructions transmitted from a serving computing system to enable the employer device to activate this delay and/or failed electronic funds transfer coverage via the selection of an interface element of a user interface of the payroll processing application. This selection at the user interface may trigger the operations at the serving computing system that effectuate the payroll payment delay and/or failed electronic funds transfer coverage. Furthermore, in some examples, the configuration and operations of the serving computing system only makes the interface element available via employer devices associated with a risk score that meets or exceeds a threshold risk score (e.g., the interface element may be "grayed out" until the risk score meets or exceeds a threshold risk score or the instructions sent from the serving computing system may direct the employer device to suppress (e.g., hide or otherwise not display) the interface element). Techniques discussed herein may thereby reduce the credit exposure and the risk of credit exposure incurred by an entity associated with the serving computing system and/or service account.

Example Environment

FIG. 1 illustrates a block diagram of an example environment 100 in which techniques discussed herein may be implemented. In some examples, the example environment 100 includes a serving computing system 102 that may include one or more computing devices and which may include a transaction processing service 104, a payroll processing system 106, and/or a risk assessment/capital loan system 108, as discussed in more detail herein. In some examples the serving computing system 102 may include a distributed (cloud) computing system, of which the transaction processing system 104, the payroll processing system 106, and/or the risk assessment/capital loan system 108 may be running on devices of the distributed computing system. In some examples, the transaction processing system 104, the payroll processing system 106, and/or the risk assessment/capital loan system 108 may function as software as a service ("SaaS"). The transaction processing system 104, the payroll processing system 106, and/or the risk assessment/capital loan system 108 are collectively referred to herein as the serving computing system 102 and references to an operation conducted by the serving computing system 102 may include an operation accomplished by the transaction processing system 104, the payroll processing system 106, and/or the risk assessment/capital loan system 108.

In some examples, the serving computing system 102 may be configured to communicate via network(s) 110 with one or more devices, such as a computing device 112 associated with an employer 114 (the "employer device 112"), who may be a self-employed merchant or a merchant that employs employees. In some examples, the transaction processing system 104 may communicate via network (s) 110 with an instance of a transaction processing application 116 executing on the computing device 112 to provide instructions to, query, receive requests from, etc. the transaction processing application 116.

In some examples, the transaction processing application 116 may provide point-of-sale ("POS") functionality to the employer device 112 to accept payments at a POS location from one or more buyers. In some types of businesses, the POS location may correspond to a store or other place of business of the employer 114, and thus, may be a fixed location that typically does not change on a day-to-day basis. In other types of businesses, however, the POS location may change from time to time, such as in the case that the merchant operates a food truck, is a street vendor, a cab driver, etc. or has an otherwise mobile business (e.g., in the case of merchants who sell items at buyer's homes, over the Internet, places of business and so forth).

In some examples, the transaction processing application 116 may additionally or alternatively provide e-commerce functionality for managing an online storefront. In some examples, this may include application-programming interface(s) for populating an online marketplace storefront (e.g., a seller account at an e-commerce website such as, for example, eBay®, Amazon®).

In some examples, the transaction processing system 104 may receive transaction data 118 from the transaction processing application 116 that may include, for example, individual transaction details between the employer 114 and a buyer (e.g., date, time, amount credited or debited, identification of goods/services purchased, payment method type, secured payment method information). The transaction processing system 104 may conduct any of a number of operations related to the POS functionality of the transaction processing application 116 such as processing payments via banks, credit card companies, etc.; storing and maintaining a ledger of transactions, etc. For example, the transaction processing system 104 may function as SaaS, for which the payroll processing application 116 is a client-oriented interface with the services provided by the transaction processing system 104, including user interface(s) and application programing interface(s) (API(s)) for interfacing with the payroll processing system 104, etc.

In some examples, the payroll processing system 106 may communicate via network(s) 110 with an instance of a transaction processing application 120 executing on the employer device 112 to provide instructions to, query, receive requests from, etc. the payroll processing application 120. In some examples, the payroll processing application 120 may equip the employer device 112 to provide payroll functions such as, for example, time-keeping, employee data storage (e.g., employee financial account information, employment duration, employee pay rates), company information storage (e.g., type of business, tax identifier(s)), payroll payment, investment and health account investments, tax payment, tax document dissemination, etc. These functionalities may be accomplished by operations at employer device 112 that are relayed to the payroll processing system 106 via the network(s) 110 for further operations by the payroll processing system 106. For example, an indication of a payroll payment specifying amounts and employee accounts to be credited may be relayed from the payroll processing application 120 to the payroll processing system 106, which stores and maintains a record of time, employee salaries or hourly rates, etc. In some examples, the payroll processing system 106 may function as SaaS, for which the payroll processing application 120 is a client-oriented interface with the services provided by the payroll processing system 106, including user interface(s) and application programing interface(s) (API(s)) for interfacing with the payroll processing system 106, etc.

In some examples, payroll data 122 generated at the payroll processing application 122 may include time-keeping information for a time period, employee data (e.g., employee financial account information, employment duration, employee pay rates), company information (e.g., type of business, tax identifier(s)), payroll payment information (e.g., an amount to be paid, an employee and/or employee account to be credited, a date the payroll payment is to be made), investment and health account contribution information, tax payment information, etc.

In some examples, the example environment 100 may further include service account device(s) 124, merchant account device(s) 126, clearinghouse device(s) 128, and employee account device(s) 130. The serving computing system 102 may communicate with any of these devices to affect a payroll payment. For example, authorization to make a payroll payment may be received at the payroll processing system 106 from the payroll processing application 120. In response, the payroll processing system 106 may initiate an electronic transfer of funds from a merchant account by contacting the merchant account device(s) 118 (e.g., servers of a financial institution) and/or clearinghouse device(s) 120 (e.g., ACH servers) to initiate an electronic transfer of funds from a merchant account to employee account device(s) 130 associated with an employee 132 of the employer 114.

In an example where an indication has been received at the payroll processing system 106 from the payroll processing application 120 indicating that an interface element has been selected indicating (1) to delay a payroll payment and the electronic funds transfer to satisfy the payroll payment has failed, or (2) acceptance of a capital loan to cover an electronic funds transfer failure even though no delay indication was received, the payroll processing system 106 may contact service account device(s) 124 to cause the service account device(s) 124 to credit the employee account device(s) 130 to satisfy the payroll payment.

In some examples, the transaction processing system 104 and/or the payroll processing system 106 may transmit indications received from the computing device 112 (e.g., selections of delay and/or cover functions), notifications from other device(s) (e.g., notification that an electronic transfer has failed), transaction data 118, and/or payroll data 122 to a risk assessment/capital loan system 108. In some examples, the risk assessment/capital loan system 108 may generate a risk score based at least in part on any of the above-mentioned data.

In some examples, this data may be indicated in the transaction data and/or payroll data received from the instance of the transaction processing application and/or payroll processing application running at an employer device. In some examples, the serving computing system may include a transaction processing service that receives the transaction data and/or a payroll processing service that receives the payroll data from an employer device. The serving computing system may further include a risk assessment service (i.e., a capital loan service that includes the risk assessment service) to which the transaction processing service and/or the payroll processing service forward the transaction data and payroll data for the risk assessment module to generate the risk score.

Example Process

FIGS. 2A-2D illustrate a pictorial flow diagram and a block diagram of an example process 200 for affecting a delay of an electronic funds transfer to satisfy a payroll payment.

At operation 202, the example process 200 may include receiving transaction data 204(1) from an instance of a merchant application (e.g., transaction processing application 116) executing on a computing device 206(1) associated with an employer 208(1) and/or payroll data 210(1) from an instance of a payroll application (e.g., payroll processing application 120) executing on the computing device 206(1)), according to any of the techniques discussed herein. This data may be received from N number of employers. In some examples, the payroll data 204 and/or transaction data 210 may be received at a serving computing system 102.

More specifically, the transaction data 204 may be received at a transaction processing system 104 of the serving computing system 102 and the payroll data 210 may be received at the payroll processing system 106, although it is understood that this may be switched or otherwise altered. In some examples, the transaction processing system 104 and the payroll processing system 106 may transmit the transaction data 204 and/or the payroll data 210 to the risk assessment/capital loan system 108. The transaction data 204 and/or the payroll data 210 submitted to the risk assessment/capital loan system 108 may correspond to N employers 208.

At operation 212, the example process 200 may include generating risk scores 214 based at least in part on the transaction data 204 and/or the payroll data 210, according to any of the techniques discussed herein. For example, the risk assessment/capital loan system 108 may generate a risk score 214 for a specific employer 208(1) based at least in part on at least one of:
- whether the net flow of currency indicated by the transaction data is positive or negative,
- a moving average of net flow to and/or the employer indicated in the transaction data,
- a number of transactions crediting the employer within a time period indicated by the transaction data,
- an average value per transaction (e.g., per a time period),
- an identification of parties with whom the employer transacts (e.g., know your customer (KYC) data),
- an amount of overtime due as part of a payroll payment (e.g., a percentage of the payroll payment that is overtime, an amount of currency that is attributable to overtime),
- a number of employees of the employer,
- a revenue index associated with an employee on the payroll (e.g., some employees increase the revenue of the business more than other employees so the more employees that are "high revenue" work, the lower the risk score of the employer),
- an age of the instance of the payroll processing application running on the employer device and/or an age of a payroll account associated with the employer and the serving computing system,
- a number and/or percentage of previous successful payroll payments,
- a number and/or percentage of previous failed payroll payments (e.g., the electronic funds transfer did not settle),
- a ratio of or a difference between payroll to revenue, gross profit, margin, and/or net profit received by the employer,
- an amount of funds indicated by the payroll payment to be paid,
- an income factor that may include one of the characteristics discussed above and/or a percentage or multiplier of an entity's income, etc.

In some examples, one or more of these features may include "hard" features. If a value of a hard feature is greater than a threshold value, then the risk score is automatically elevated to a "high risk" score. For example, if the payroll payment includes 20% or more of overtime, the risk score may be elevated to a "high risk" score or if the payroll payment, regardless of the other values. This may include combinations of hard features. For example, if the payroll payment comes from a coffeeshop and includes 20% overtime, the risk score may be scored normally, but if the payroll payment from the coffeeshop includes 25% overtime, the risk score may be elevated to a "high risk" score.

In some examples, the risk assessment/capital loan system 108 may generate a risk score 214 for an individual employer 208(1) and may compare the risk score 214 for that individual to a risk score threshold and determine whether the individual employer's 208(1) risk score is "low risk" or "high risk." Depending on how the risk scores 214 are generated, "low risk" may be indicated by the risk score 214 meeting or exceeding the risk score threshold or, in another example, "low risk" may be indicated by the risk score 214 being less than the risk score threshold (i.e., where a higher score is higher risk, e.g., due to more previous failed electronic transfers, a higher number of overtime hours due in a payroll payment, a high ratio of payroll payment to net profit).

For example, the risk assessment/capital loan system 108 may generate the risk score 214 based at least in part on a sum of weighted points assigned for each feature of the transaction data and/or payroll data used. Where a higher risk score indicates a higher risk, a number of times that a previous electronic transfer may be assigned points and may be weighted more heavily than points assigned to a number of employees of the business. Similarly, points assigned to an average ratio of payroll payment amount due to net gross profit may be more heavily weighted than points assigned to an average value per transaction.

In a very simplistic version of these techniques, where a higher score indicates higher risk, the risk assessment/capital loan system 108 may be configured to assign 0 points to a "previous electronic transfer failure" feature of the payroll data that indicates that 0 previous electronic transfers have failed and 4 points to a "ratio of payroll payment amount due to net profit" feature where the payroll payment to be made is $4,000 and the net profit is $10,000 (i.e., resulting in a ratio of payroll payment amount due to net profit of 2:3). A weight of 1.2 may be associated with the "previous electronic transfer failure" feature, a weight of 1.3 may be associated with the "ratio of payroll payment amount due to net profit" feature, and the risk score threshold may be 10, in a non-limiting example. It is understood that other values are likely to be used in a real-world example where all features are being taken into account by the risk assessment/capital loan system 108. In this example, the risk assessment/capital loan system 108 may determine that an employer from which the transaction data and payroll data was received is "low risk" because the risk score, 5.2 (i.e., $1.2 \cdot 0 + 1.3 \cdot 4 = 5.2$), is less than the example threshold value, 10.

In an additional or alternate at least one feature, such as a number of previous electronic transfer failures, may be associated with a heuristic rule such that a value that meets or exceeds the heuristic rule value disqualifies the employer as "high risk" and/or qualifies the employer as "low risk" if the heuristic value is not met. For example, a heuristic rule may dictate that an employer is "high risk" if a number of previous electronic transfer failures equals or exceeds two failures.

Figure 2A:
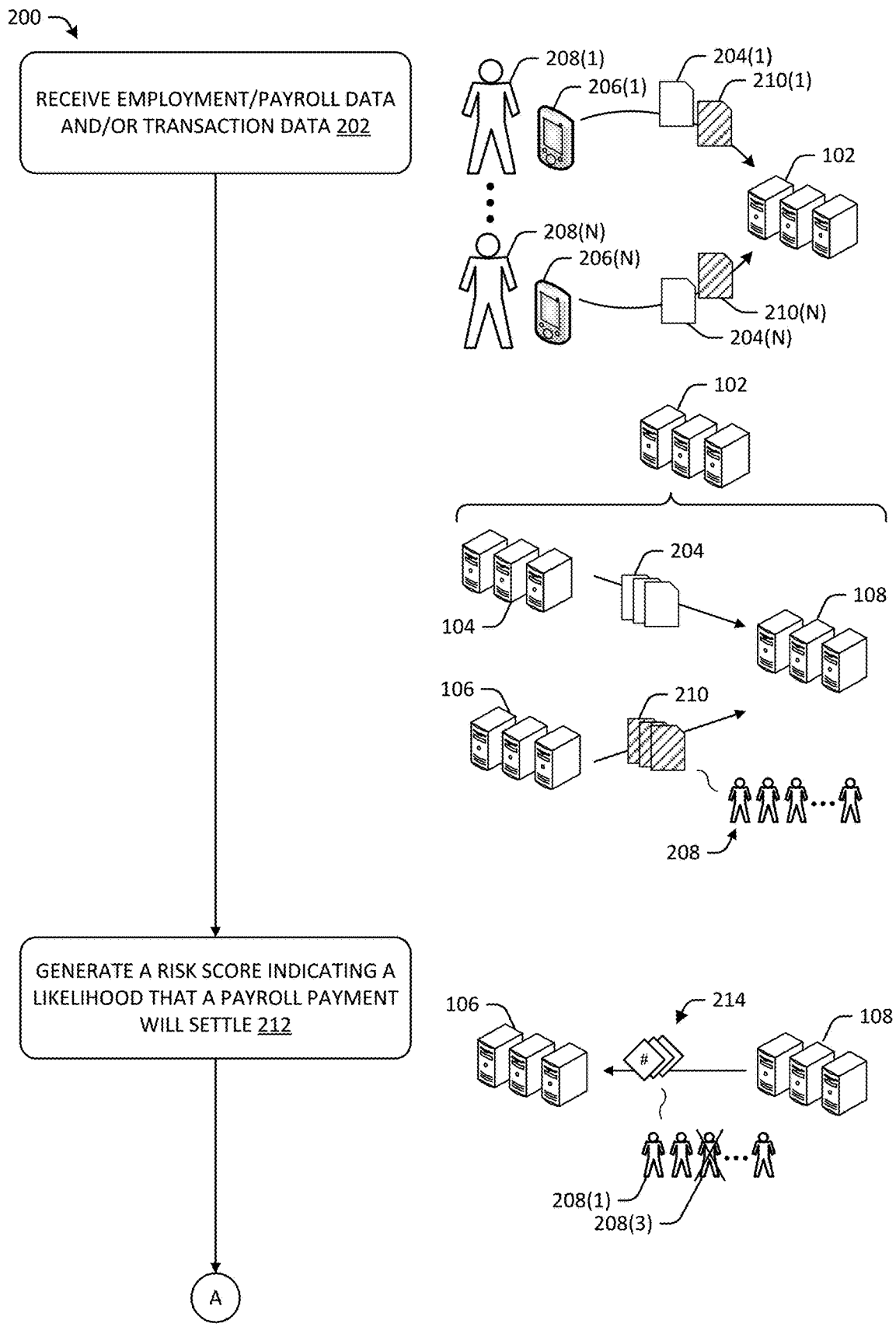
FIGS. 2A-2D illustrate a pictorial flow diagram of an example process for affecting a delay of an electronic funds transfer to satisfy a payroll payment.

In some examples, the risk assessment/capital loan system 108 may transmit risk scores for multiple employers (e.g., 208(1) and 208(3), among others in FIG. 2A) to the payroll processing system 106. In an additional or alternate example, the risk assessment/capital loan system 108 may transmit indications of whether the multiple employers are low risk or not. For example, FIG. 2A depicts that the risk assessment/capital loan system 108 generated (and transmitted to the payroll processing system 106) a risk score associated with employer 208(1) that indicates that the employer 208(1) is "low risk," whereas employer 208(3) is "high risk." For the sake of clarity, "low risk" is referred to herein as being associated with a risk score that meets or exceeds a threshold score, although it is understood that, depending on how the risk assessment/capital loan system 108 is configured, e.g., whether adding "points" to the score is a demerit, "low risk" may be associated with a risk score that is less than or less than or equal to the risk score threshold.

Figure 2B:
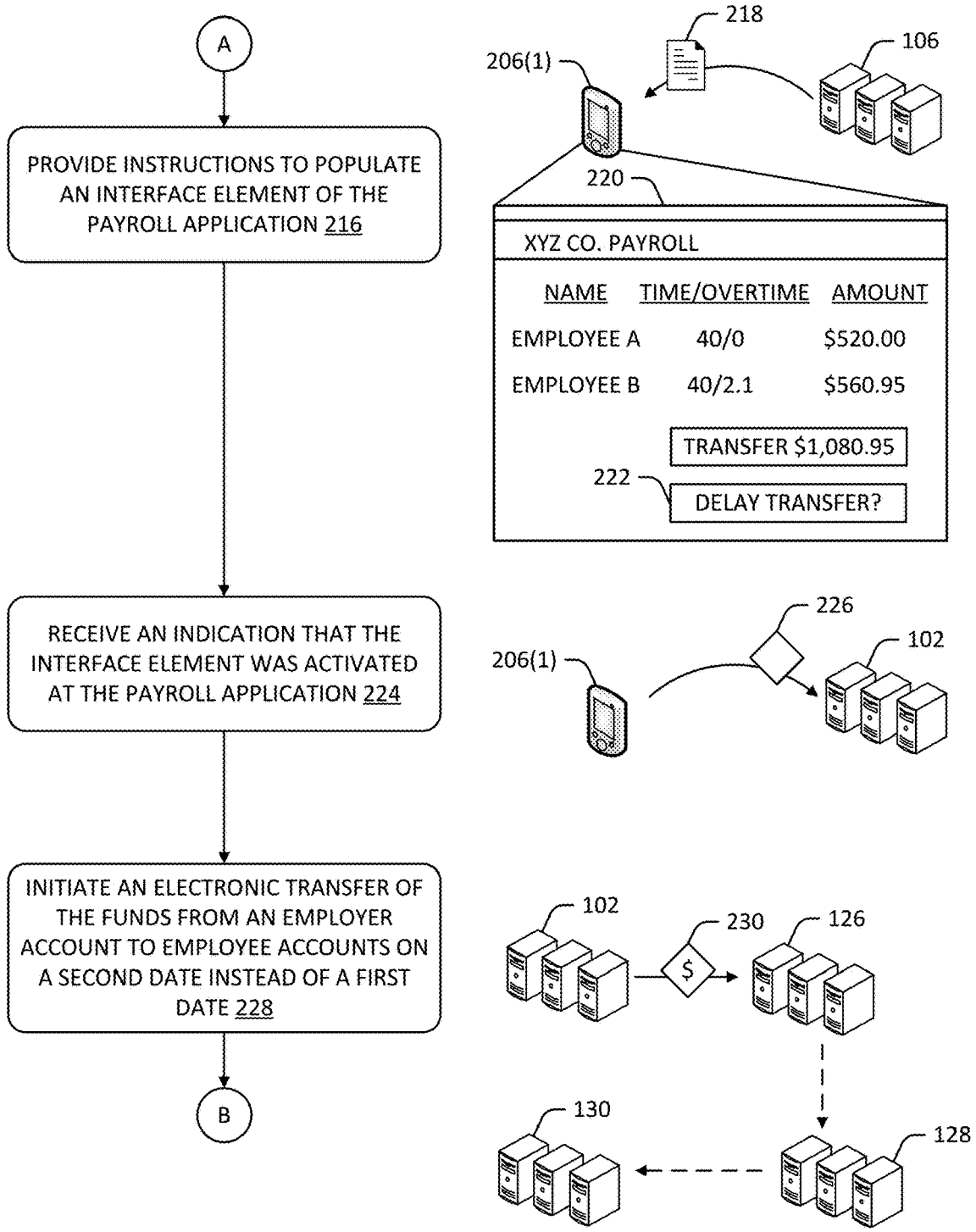

At operation 216, depicted in FIG. 2B, the process 200 may include providing instructions 218 to populate, via a user interface 220 of the payroll application, an interface element 222, selection of which triggers a delay of an electronic withdrawal of funds from the employer account from a first date to a second date after the first date, according to any of the techniques discussed herein. In some examples, the payroll processing system 106 may transmit these instructions 218 to the employer device 206(1). In some examples, the payroll processing system 106 may transmit these instructions 218 to all employer devices 206 associated with "low risk" risk scores and a subset of the N employers. In some examples, providing instructions 218 to the employer device 2016(1) may include providing SaaS instructions to an API and/or SaaS interface of the payroll application.

In some examples, the instructions 218 may configure the user interface 220 to populate the interface element 222 of the user interface 220 by transitioning the interface element 222 from being "grayed out" (e.g., a non-selectable display of the interface element that includes an indication that the interface element is not selectable, for example, by eliminating shadowing, presenting the interface element in grayscale and/or higher opacity, etc.) to being available for selection and including an indication that the interface element 222 is available for selection. In an additional or alternative example, the instructions 218 may configure the user interface 220 to populate the interface element 222 of the user interface 220 by presenting the interface element 222, where the interface element 222 was not displayed or otherwise available via the payroll application and/or user interface 220.

In some examples, the risk score may be generated repeatedly (e.g., at regular time intervals, when a payroll payment is due within a week, after m number of new transaction data and/or payroll data has been received) and the payroll processing system 106 may transmit the instructions to populate the interface element 222 once at least one risk score indicates that the employer 208 is associated with a "low risk" score. Until a "low risk" risk score is generated for an employer 2018, the interface element 222 may be unpopulated by being "grayed out," not appearing in the user interface 220, etc. (e.g., the payroll processing system 106 may not make the functionality available via an API). In some examples, the interface element 222 may include a first interface element (un-illustrated) for selecting a portion of the payroll payment amount to cover (e.g., a slider, a field) should the electronic transfer fail, and/or a selectable element for activating delay of the payroll payment. In some examples, a risk score may indicate that an employer is "low risk" at one payroll amount, but as "high risk" at a higher payroll amount. In some examples, the payroll processing system may display a selectable slider or other interface element that allows the employer to select up to a payroll amount associated with an inflection point between a payroll amount associated with a "low risk" score and a "high risk" score.

For example, if a payroll amount due is $2,500 and the risk assessment/capital loan system 108 determines that the employer is associated with a "low risk" score for any payroll amount under $2,000, but is associated with a "high risk" score for payroll amounts higher than $2,000, then the payroll processing system 104 may provide instructions to the payroll processing application to populate an interface element selectable to delay the payroll payment and a notification that up to $2,000 will be covered if the electronic transfer (or a portion thereof) fails and/or an interface element selectable to cover up to $2,000 (e.g., a slider that allows the employer to select between $0 and $2,000).

In some examples, activating the interface element 222 may "enroll" the employer device 206(1) (i.e., make coverage of failed electronic transfers and/or delays of payroll payments) available permanently and/or until a time period passes (e.g., 6 months, 1 payroll date, 2 pay periods, 12 pay periods), a risk score indicates that the employer is "high risk," a number of electronic transfers associated with the employer fail within a time period (e.g., three within a year), etc. In some examples, when the enrollment expires, the interface element may be displayed as being selectable again and, until then, the user interface may include an indication that the employer device is enrolled (e.g., presenting, via the user interface, a notification that "this device is enrolled in delayed payroll payments"). In some examples, the payroll processing system 106 may re-enroll the employer device 206(1) automatically so long as a risk score indicates the employer is "low risk" and/or that an outstanding amount of any capital loans has a threshold portion remaining (e.g., 10% remaining of the total originally loaned, $1,000 remaining of the total originally loaned). In some examples, the payroll processing system 106 may disenroll the employer device 206(1) prematurely based at least in part on a triggering event such as, for example, receiving notice that a threshold number of electronic transfers have failed within a time period (e.g., three of the last four payroll payments for four separate payroll dates have failed).

At operation 224, the example process 200 may include receiving an indication 226 that the interface element was activated at the payroll application, according to any of the techniques discussed herein. In some examples, this indication 226 may be received at the payroll processing system 106 and may include an acceptance of capital loan terms, an authorization to initiate the electronic transfer, instructions to delay the electronic transfer, a date and/or time at which to initiate the electronic transfer, a portion of the payroll payment to cover should the electronic transfer fail (if an interface element was displayed to allow the employer to cover less than all of the payroll payment), etc. In some examples, receiving the indication 226 that the interface element was activated causes the payroll processing system 106 to delay initiating the electronic funds transfer from a first date (e.g., a traditional withdrawal transfer date such as, for example, 3-5 business days before the payroll date) to a second date later than the first date (e.g., the night before the payroll date or a time and date earlier than the night before the payroll date and later than the traditional withdrawal transfer date specified by the employer via the payroll processing application).

At operation 228, the example process 200 may include initiating, responsive to receiving the indication 226 an electronic transfer of funds 230 from an employer account 126 to employee account(s) 130, according to any of the techniques discussed herein. In some examples, the payroll processing system 106 may initiate the electronic transfer of funds 230 by transmitting a request to merchant account device(s) 126 and/or clearinghouse device(s) 128 (e.g., ACH servers). The example depicted in FIG. 2B includes a first operation depicted in a solid line, contacting the merchant account device(s) 126 in this example, to cause the electronic transfer, and incomplete operations to complete (i.e., settle) the electronic funds transfer in dashed lines.

Figure 2C:
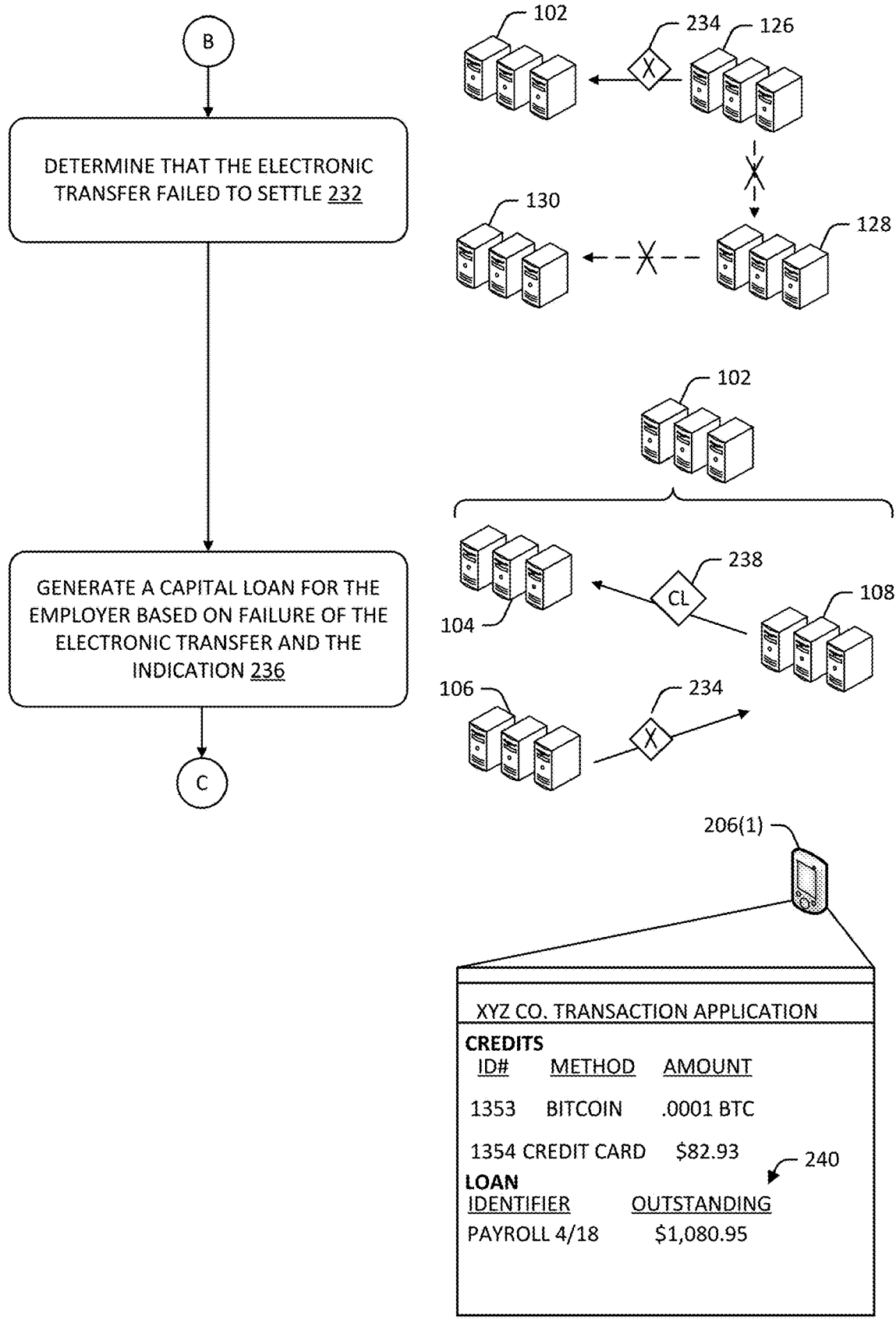

At operation 232, depicted in FIG. 2C, the example process 200 may include determining that the electronic transfer failed to settle, according to any of the techniques discussed herein. In some examples, this may include receiving no response from the merchant account device(s) 126 and/or the clearinghouse device(s) 128 and/or receiving a response 234 from the merchant account device(s) 126 and/or the clearinghouse device(s) 128, indicating that the electronic transfer failed.

At operation 236, the example process 200 may include generating a capital loan 238 for the employer based at least in part on the failure of the electronic transfer and the indication that the interface element was activated, according to any of the techniques discussed herein. In some examples, this may include registering the employer device 206(1) in association with an amount specified by a capital loan, which may include associating the employer device 206(1) with a tracking notifier for the capital loan. For example, this may include the transaction processing service 104 tracking, based on the capital loan having been associated with the employer device 206(1), transactions generated by the employer device 206(1) and relaying the tracked transactions to the risk assessment/capital loan system 108 and/or the payroll processing system 106. In some examples, the capital loan 238 may be associated with a loan product to assist employers with their operational needs. In some examples, the payroll payment service may offer different types of loan products within the capital loan product. For example, the payroll processing service may offer a daily repayment loan product, wherein a capital loan is repaid daily, for instance, from a portion of transactions processed by the payment processing service on behalf of the borrow. Of course, daily repayment may be provided, additionally or alternatively, via an alternative source (e.g., a borrower's bank account, etc.). Additionally and/or alternatively, the payroll processing service may offer a monthly repayment loan product, wherein a capital loan is repaid monthly, for instance, via a debit from a bank account linked to the payment processing service. Of course, monthly repayment may be provided via an alternative source (e.g., an unlinked bank account, etc.) as well. One or more additional and/or alternative loan products may be associated with the capital loan product. Additionally and/or alternatively, the capital loan may be repaid via a withheld portion of transactions, as discussed in more detail below. In some examples, the capital loan product may be adjusted based at least in part on the risk score.

In some examples, the payroll processing system 106 may make enrolling (e.g., activating delay of payroll payment and/or covering failed electronic payments) unavailable to an employer 208(1) via the employer device 206(1) until an outstand amount of any previous capital loans is less than or equal to a threshold portion of the original outstanding portion (e.g., 10% of the original amount, $1,000 of the original amount). In some examples, once this condition is met (e.g., the outstanding amount is 10% of the original amount), the payroll processing system 106 may transmit instructions to the payroll processing application 120 to present a notification that enrollment is available again.

In some examples, the payroll processing system 106 may transmit an indication that the electronic transfer failed to the risk assessment/capital loan system 108. In some examples, the payroll processing system 106 may attempt the electronic transfer multiple times and may transmit the failure indication to the risk assessment/capital loan system 108 once the electronic transfer has failed a specified number of times (e.g., 3 times). In some examples, the risk assessment/capital loan system 108 may generate the capital loan 238 based at least in part on terms presented at the user interface of the payroll processing application at the time the interface element 222 was activated and/or the risk score. In some examples, the risk assessment/capital loan system 108 may transmit instructions related to the capital loan 238 to the transaction processing system 104 and/or the payroll processing system 106. Either or both of these systems (104 and/or 106) may transmit instructions to the employer device 206(1) to reflect existence of the capital loan 238 and repayment terms and/or repayment progress. In some examples, this may include transmitting instructions to a transaction processing application and/or payroll processing application to display an outstanding amount 240 of the capital loan.

Figure 2D:
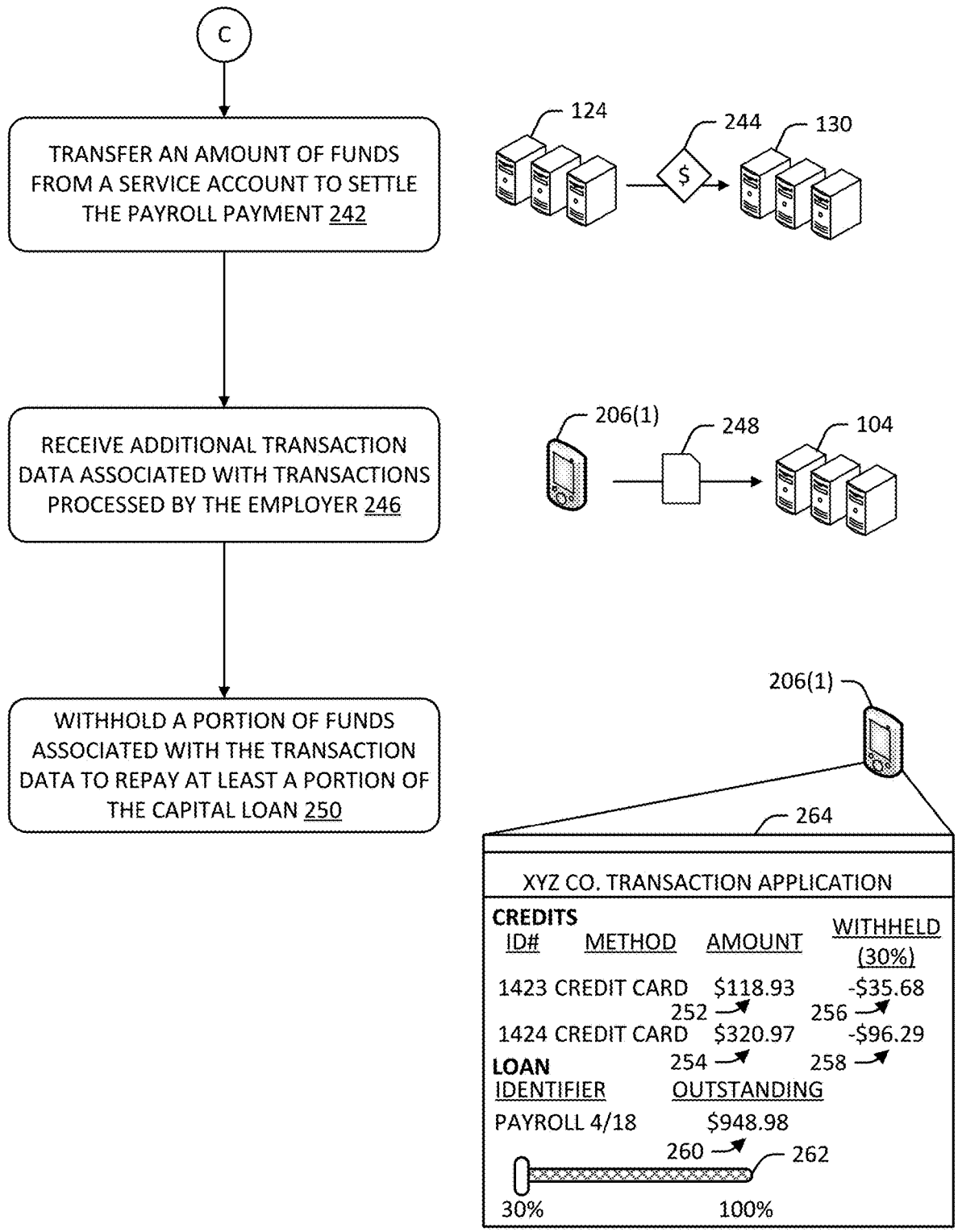

At operation 242, depicted in FIG. 2D, the example process 200 may include transferring an amount of funds 244 from a service account associated with the transaction processing service to settle the payroll payment (e.g., by depositing the funds in employee account(s)), according to any of the techniques discussed herein. In some examples, the amount of funds may correspond to an amount specified by the capital loan, which may correspond to the payroll payment amount or a portion thereof (e.g., where the portion corresponds to a selection of an interface element that indicates a portion of the total payroll payment). This function (i.e., transferring funds from a service account, instead of an employer account, to employee account(s) to settle a payroll payment) is referred to herein as "covering" a failed electronic transfer.

At operation 246, the example process 200 may include receiving additional transaction data, according to any of the techniques discussed herein. In some examples, this may include receiving additional transaction data 248 at the transaction processing system 104 from the employer transaction processing application of the employer device 206(1). This additional transaction data 248 may be associated with transaction(s) (e.g., a sale to a buyer) processed by the employer at the employer device following a payroll date, an electronic transfer failure, etc.

At operation 250, the example process 200 may include withholding a portion of funds (e.g., 252 and/or 254) associated with the additional transaction data 248, according to any of the techniques discussed herein. FIG. 2D depicts an example where two additional transactions have been conducted at the employer device 206(1) associated with credits to the employer of $118.93 and $320.97. In the depicted example, the portion withheld (e.g., 256 and 258) corresponds to 30% of the transaction totals, $35.68 and $96.29, respectively. In some examples, the withheld portion is credited towards an outstanding amount of the capital loan, indicated in the example illustration at 260. Note the decrease in the outstanding amount displayed via the user interface of the transaction processing application at generation of the loan in FIG. 2C, $1,080.95, and the outstanding amount displayed via the user interface of the transaction processing application in FIG. 2D, $948.98, which is $131.97 less, corresponding to the amounts withheld from the additional transactions. In some examples, the portion withheld may correspond to a selection of an interface element 262 presented via a user interface 264 the transaction processing application and/or the payroll processing application (e.g., selection of a slider that can increase or decrease the portion withheld). For example, an employer may increase or decrease the amount withheld based at least in part on selection of the interface element 262. In some examples, the portion withheld may be set by the transaction processing system 104. In some examples, the portion withheld and/or the range of selectable portions available via the interface element 262 may be based at least in part on the risk score and/or a number of previous electronic transfer failures. For example, the transaction processing system 104 may increase the withheld portion based at least in part on previous electronic transfer failures or provide instructions to the transaction processing application at the employer device 206(1) such that the interface element 262 allows a lowest portion that is higher than a previous amount available via the interface element 262 (e.g., a minimum range of the slider may correspond to a 40% withhold rate instead of 30% withhold rate).

In some examples, the transaction processing system 104 may set the withhold rate based at least in part on historical transaction data from which the transaction processing system 104 generates a prediction of revenue between the payroll date and a next payroll date. In this example, the transaction processing system 104 may set the withhold rate based at least in part on the predicted revenue such that the outstanding amount for the loan is zero by the next or future payroll date. In some examples, generating the predicted revenue may include querying the payroll processing system 106 to determine which employee(s) are scheduled between the payroll date and the next payroll date and to obtain a revenue index associated with the employee(s) that indicates an amount of revenue associated with the employee(s). For example, some employees tend to make more revenue for companies than others and the transaction processing system 104 and/or the payroll processing system 106 may use historical sales data associated with an employee (e.g., reflected in transaction date received from the employer device 206(1) to generate a prediction of revenue for that employee for the given time period (e.g., Bob normally sells between $35,000 and $40,000 the first two weeks of February).

In some examples, the transaction processing system 104 may continue to withhold a portion of additional transaction data 248 until the outstanding amount for any capital loans is repaid. In some examples, another electronic transfer may fail and an additional capital loan may be added. In some examples, the transaction processing system 104 may transfer the withheld portion to the service account.

Example Process

FIGS. 3A-3D illustrate a pictorial flow diagram and a block diagram of an example process 300 for affecting a coverage of a failed electronic funds transfer. In some examples, example process 300 may be instituted when an activation of a delay has already been received, and/or the employer has been enrolled in some way or in an example where no such activation has been received.

At operation 302, the example process 300 may include receiving transaction data 304(1) from an instance of a merchant application (e.g., transaction processing application 116) executing on a computing device 306(1) associated with an employer 308(1) and/or payroll data 310(1) from an instance of a payroll application (e.g., payroll processing application 120) executing on the computing device 306(1), according to any of the techniques discussed herein. This data may be received from N number of employers. In some examples, the payroll data 304 and/or transaction data 310 may be received at a serving computing system 102.

In some examples, the transaction data 304 may be received at a transaction processing system 104 of the serving computing system 102 and the payroll data 310 may be received at the payroll processing system 106, although it is understood that this may be switched or otherwise altered. In some examples, the transaction processing system 104 and the payroll processing system 106 may transmit the transaction data 304 and/or the payroll data 310 to the risk assessment/capital loan system 108. The transaction data 304 and/or the payroll data 310 submitted to the risk assessment/capital loan system 108 may correspond to N employers 308.

At operation 312, the example process 300 may include generating risk scores 314 based at least in part on the transaction data 304 and/or the payroll data 310, according to any of the techniques discussed herein.

Figure 3A:
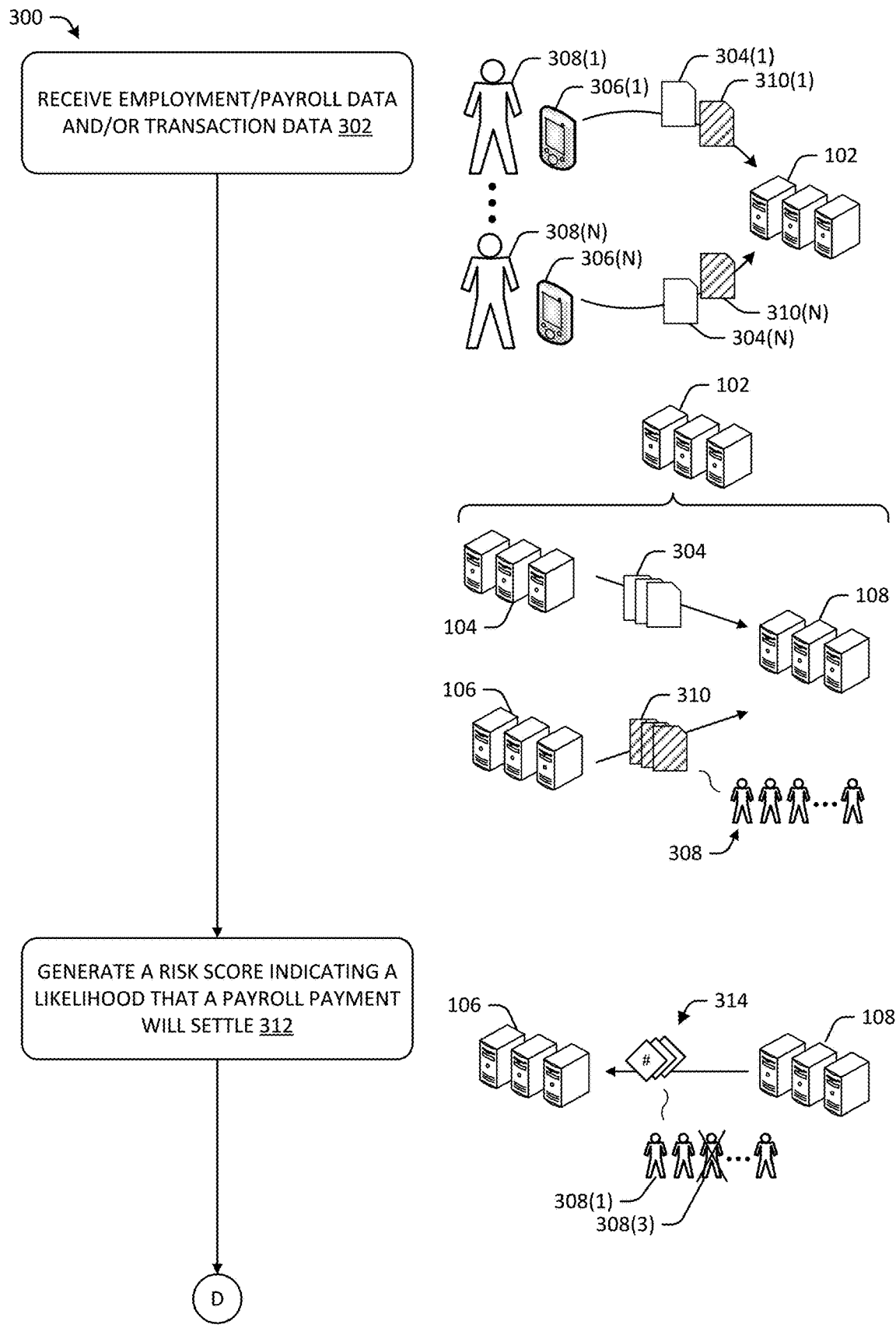
FIGS. 3A-3D illustrate a pictorial flow diagram of an example process for making a payroll payment via a service account in the case of an electronic payroll payment failure.
Figure 3B:
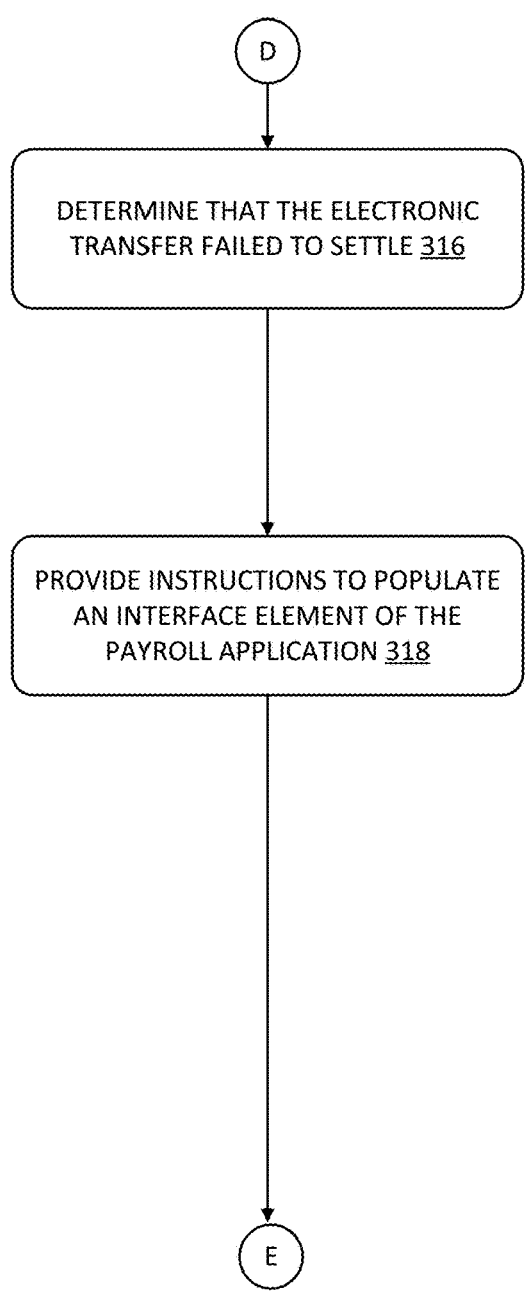
Figure 3B:
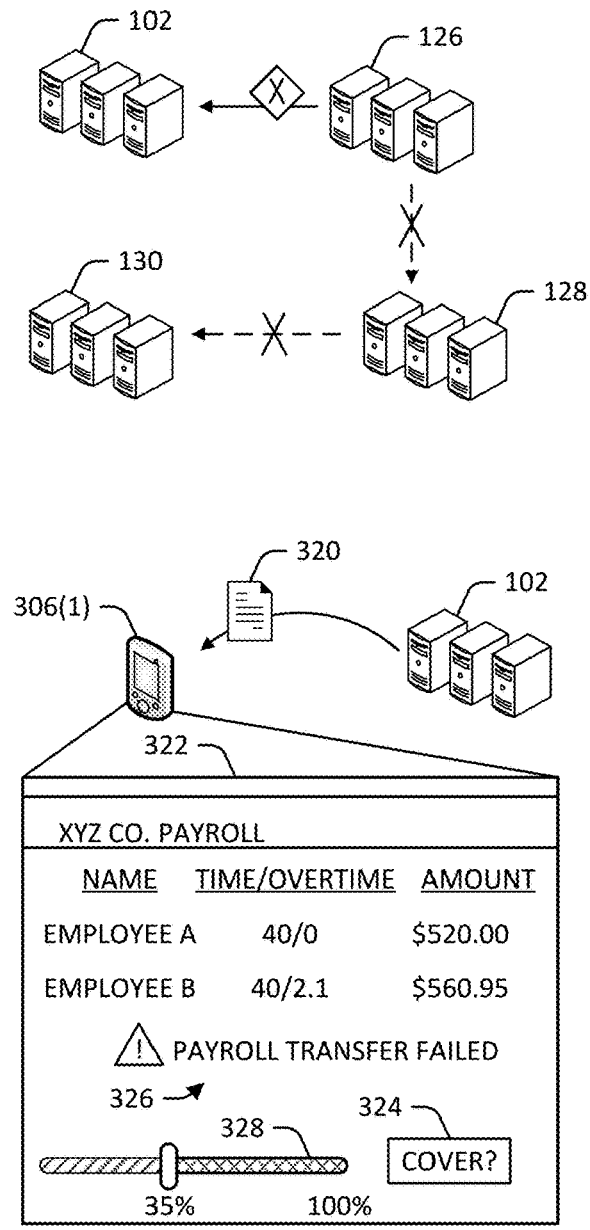

At operation 316, depicted in FIG. 3B, the process 300 may include determining that an electronic transfer failed to settle, according to any of the techniques discussed herein. In some examples, this may have been responsive to initiating an electronic transfer after receiving an indication to cause the electronic transfer from the employer device 306(1). In an additional or alternate example, another device may have initiated the electronic transfer, and a notification that the transfer failed may have been transmitted to the service computing system 102 from a clearinghouse device and/or the employer device (e.g., from the payroll application).

At operation 318, the example process 300 may include providing instructions 320 to populate, via a user interface 322 of the payroll application, an interface element 324, selection of which triggers a covering a failed electronic withdrawal of funds from the employer account, according to any of the techniques discussed herein. In some examples, the instructions may further include instructions to display a notification that the electronic transfer failed 326 and/or a second interface element 328, the selection of which specifies a portion of the failed payroll payment to cover (e.g., 100% of the failed payroll payment, $2,000, payments to specific employees), if the interface element 324 is selected.

In some examples, the instructions 320 may configure the user interface 322 to populate the interface element 324 (and/or 328) of the user interface 220 by transitioning the interface element 324 (and/or 328) from being "grayed out" (e.g., a non-selectable display of the interface element that includes an indication that the interface element is not selectable, for example, by eliminating shadowing, presenting the interface element in gray-scale and/or higher opacity, etc.) to being available for selection and including an indication that the interface element 324 (and/or 328) is available for selection. In an additional or alternative example, the instructions 320 may configure the user interface 322 to populate the interface element 324 (and/or 328) of the user interface 322 by presenting the interface element 324 (and/or 328), where the interface element 324 (and/or 328) was not displayed or otherwise available via the payroll application and/or user interface 322.

Figure 3C:
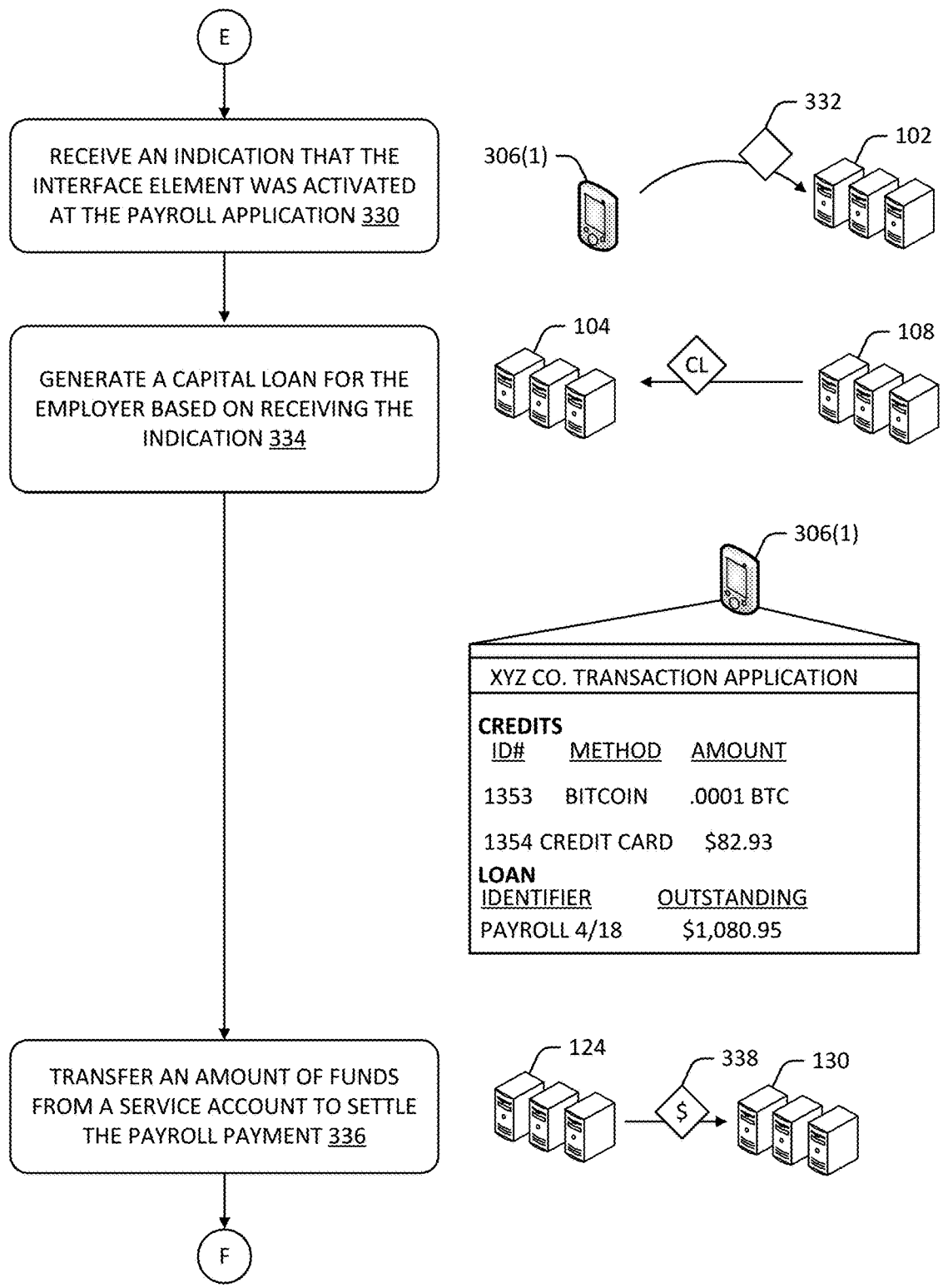

At operation 330, depicted in FIG. 3C, the process 300 may include receiving an indication 332 that the interface element 324 (and/or 328) was activated at the payroll application of the employer device 306(1), according to any of the techniques discussed herein.

At operation 334, the example process 300 may include, generating a capital loan for the employer based at least in part on receiving the indication 332, according to any of the techniques discussed herein. In some examples, this may include registering the employer device 306(1) in association with an amount specified by a capital loan, which may include associating the employer device 306(1) with a tracking notifier for the capital loan. For example, this may include the transaction processing service 104 tracking, based on the capital loan having been associated with the employer device 306(1), transactions generated by the employer device 306(1) and relaying the tracked transactions to the risk assessment/capital loan system 108 and/or the payroll processing system 106. In some examples, the capital loan may be in an amount of the payroll payment or a portion thereof, if a portion has been specified by interface element 328.

At operation 336, the example process 300 may include transferring an amount of funds 338 (e.g., the amount of the capital loan discussed above) from a service account to settle the payroll payment, according to any of the techniques discussed herein.

Figure 3D:
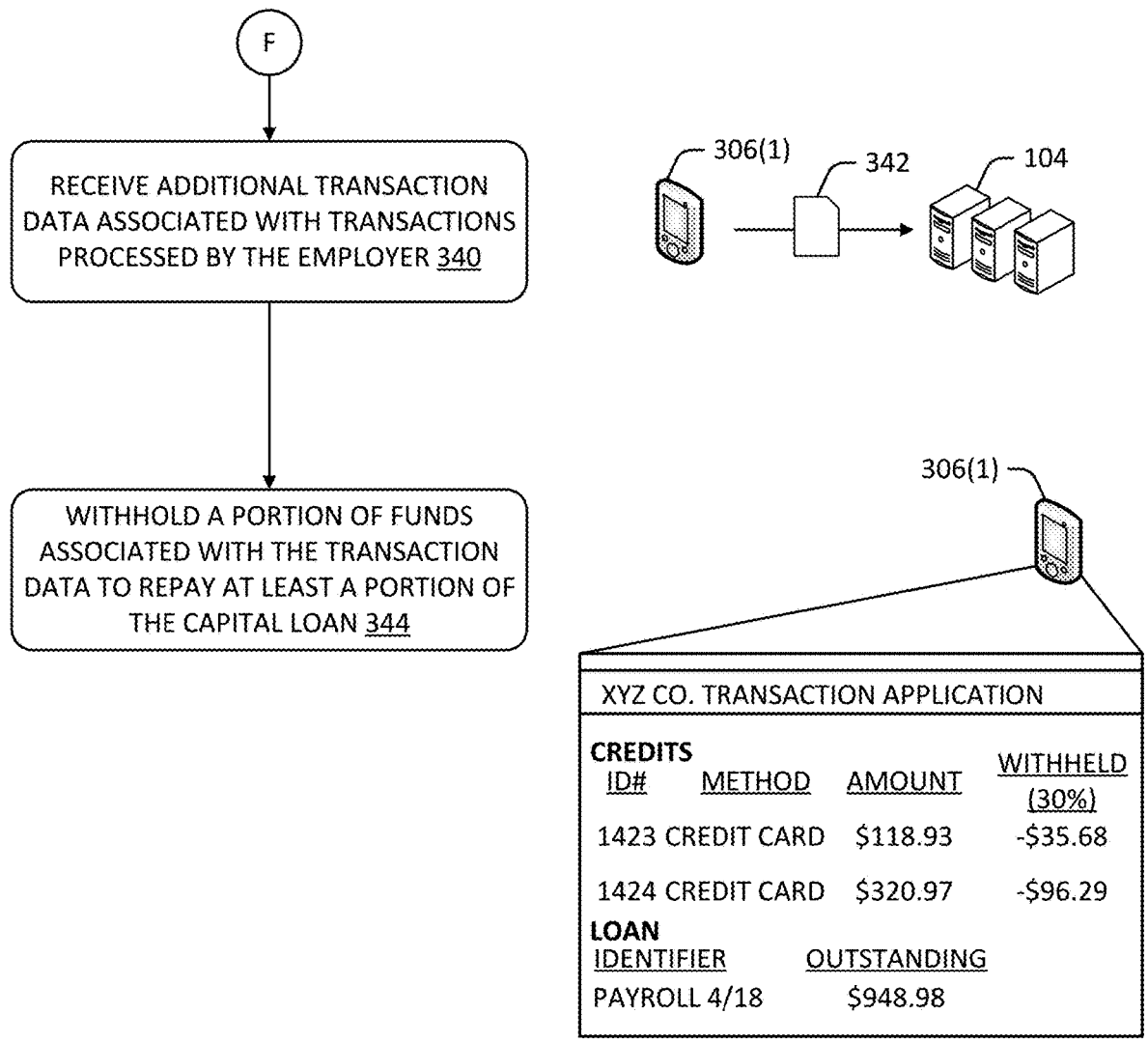

At operation 340, depicted in FIG. 3D, the process 300 may include receiving additional transaction data 342, according to any of the techniques discussed herein.

At operation 344, the example process 300 may include withholding a portion of funds associated with the additional transaction data 248, according to any of the techniques discussed herein.

Example System

Figure 4:
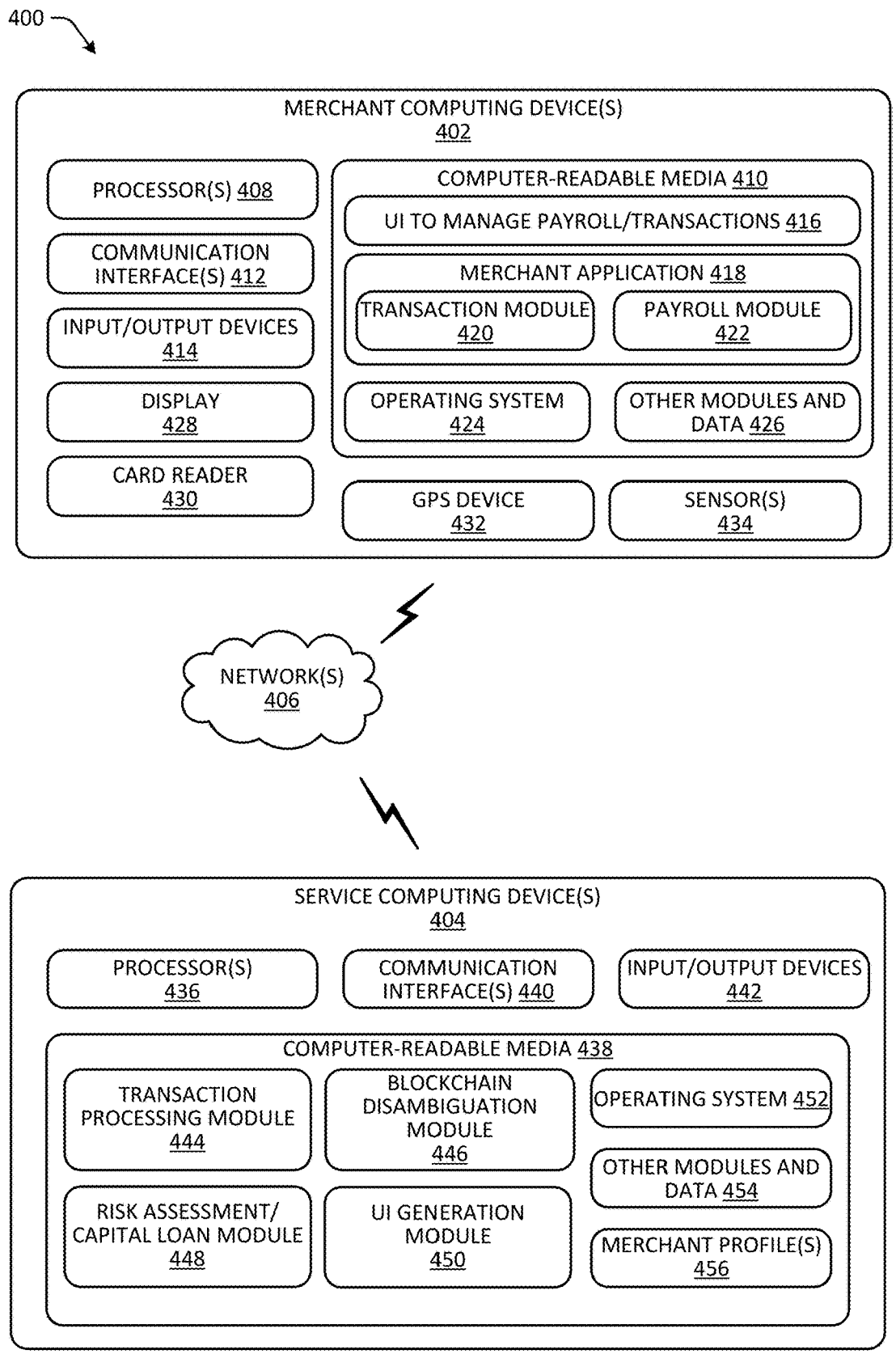
FIG. 4 illustrates an example employer device and an example serving computing system for delaying an electronic transfer and/or covering a failed electronic transfer.

FIG. 4 illustrates an example system 400 for delaying an electronic transfer and/or covering a failed electronic transfer. For the purpose of FIG. 4, an employer may be a merchant. The system 400 may include merchant computing device(s) 402 (operated by merchant(s)) that communicate with serving computing device(s) 404 (which may be associated with a service provider such as a transaction processing service) via network(s) 406 (e.g., the Internet, cable network(s), cellular network(s), wireless network(s) (e.g., Wi-Fi) and wired network(s), as well as close-range communications such as Bluetooth®, Bluetooth® low energy, and the like). Merchant computing device(s) 402 may correspond to computing (employer) device 112, 206(1), and/or 306(1), serving computing device(s) 404 may correspond to serving computing system 102, and network(s) 406 may correspond to network(s) 110.

In at least one example, the merchant computing device(s) 402 may be any suitable type of computing device, e.g., portable, semi-portable, semi-stationary, or stationary. Some examples of the merchant computing device(s) 402 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device(s) 402 include one or more processors 408, one or more computer-readable media 410, one or more communication interfaces 412, and one or more input/output (I/O) devices 414. Each processor 408 may itself comprise one or more processors or processing cores. For example, the processor(s) 408 may be implemented as one or more microprocessors, microcomputers, microcontrollers, digital signal processors, central processing units, state machines, logic circuitries, and/or any devices that manipulate signals based at least in part on operational instructions. In some examples, the processor(s) 408 may be one or more hardware processors and/or logic circuits of any suitable type specifically programmed or configured to execute the algorithms and processes described herein. The processor(s) 408 may be configured to fetch and execute computer-readable processor-executable instructions stored in the computer-readable media 410 to conduct any of the operations discussed herein.

Depending on the configuration of the merchant computing device(s) 402, the computer-readable media 410 may be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 410 may include, but is not limited to, RAM, ROM, EEPROM, flash memory, solid-state storage, magnetic disk storage, optical storage, and/or other computer-readable media technology. Further, in some examples, the merchant computing device(s) 402 may access external storage, such as RAID storage systems, storage arrays, network attached storage, storage area networks, cloud storage, or any other medium that can be used to store information and that can be accessed by the processor(s) 408 directly or through another computing device or network. Accordingly, the computer-readable media 410 may be computer storage media able to store instructions, modules or components that can be executed by the processor(s) 408. Further, when mentioned, non-transitory computer-readable media exclude media such as energy, carrier signals, electromagnetic waves, and signals per se.

The computer-readable media 410 may be used to store and maintain any number of functional components that are executable by the processor(s) 408. In some implementations, these functional components comprise instructions or programs that are executable by the processor(s) 408 and that, when executed, implement operational logic for performing the actions and services attributed above to the merchant computing device(s) 402. Functional components stored in the computer-readable media 410 may include a user interface 416 (UI) to manage payroll and/or transactions and a merchant application 418 (which may control the UI 415 and/or which may include a client-facing API and/or interface for SaaS provided by the service computing device(s) 404). In some examples, the merchant application 418 may include a transaction module 420 and a payroll module 422. In some examples, the transaction module 420 may correspond to the transaction processing application 116 and the payroll module 422 may correspond to the payroll processing application 120.

The UI 416 may, among other things, present user interface(s) that enable a merchant to modify payroll, employee data, interface with SaaS services, etc. UI 416 may correspond to any of the UIs discussed herein. In at least one example, the UI 416 may be presented via a web browser, or the like. In other examples, the UI 416 may be presented via an application (e.g. transaction module 420 and/or payroll module 422), such as a mobile application or desktop application, which is provided by the service provider, or which can be an otherwise dedicated application.

In at least one example, the transaction module 420 may receive instructions from the transaction processing system 104 and/or the risk assessment/capital loan system 108 to control the UI 416 and/or the payroll module 422 may receive instructions from the payroll processing system 106 and/or the risk assessment/capital loan system 108 to control the UI 416.

In some examples, the user interface may include a mechanism (e.g., the interface elements discussed herein), the actuation of which indicates that the merchant accepts a particular custom capital offer. The mechanism may be a graphical control element, control, widget, etc. In at least one example, the UI 416 may determine when such a mechanism is actuated (e.g., by the employer) and can send an instruction to the serving computing device(s) 404 to initiate loan processing in response to actuation. In some examples, actuation of such a mechanism may initiate display of a further UI to obtain further details about the employer in order to initiate loan processing, although, in some examples, this information may be retrieved from employment data stored at the service computing device(s) 404 that was previously received via network(s) 406 from the payroll module 422.

The merchant application 418 may provide POS functionality to the merchant computing device(s) 402 to enable the merchant to accept payments from one or more customers at a POS location. For example, the merchant may use the merchant computing device(s) 402 to accept payments through various different types of payment instruments, e.g., payment cards, electronic payment, cash or check, at the POS location from the one or more customers. In at least one example, the transaction module 420 may present various user interfaces to enable a merchant to conduct transactions, receive payments, and so forth. Further, the transaction module 420 may enable the merchant to manage transactions, payments, and so forth, via a dashboard. For the purpose of this discussion, a dashboard can be a user interface that provides an at-a-glance view of key information (e.g., associated with transactions, payments, etc.).

The computer-readable media 410 may include additional functional components, such as an operating system 424 for controlling and managing various functions of the merchant computing device(s) 402 and for enabling basic user interactions. In addition, the computer-readable media 410 may also store data, data structures and the like, that are used by the functional components. Depending on the type of the merchant computing device(s) 402, the computer-readable media 410 may also optionally include other functional components and data, such as other modules and data 426, which may include programs, drivers, etc., and the data used or generated by the functional components. For instance, in some examples, the merchant computing device(s) 402 may include a payroll module, an inventory management module, an employee management module, a financing module, an appointment module, etc., which may facilitate payroll services, inventory management services, employee management services, financing services, appointment services, etc., respectively. Further, the merchant computing device(s) 402 may include many other logical, programmatic and physical components, of which those described are merely examples that are related to the discussion herein.

The communication interface(s) 412 may include one or more interfaces and hardware components for enabling communication with various other devices, such as over the network(s) 406 or directly. For example, communication interface(s) 412 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 402 may further include the one or more I/O devices 414. The I/O devices 414 may include speakers, a microphone, a camera, and various user controls (e.g., buttons, a keyboard, a keypad, touchpad, etc.), a haptic output device, and so forth.

In at least one example, merchant computing device(s) 402 may include a display 428. Depending on the type of computing device(s) used as the merchant computing device(s) 402, the display 428 may employ any suitable display technology. For example, the display 428 may be a liquid crystal display, a plasma display, a light emitting diode display, an OLED (organic light-emitting diode) display, an electronic paper display, or any other suitable type of display able to present digital content thereon. In some examples, the display 428 may have a touch sensor associated with the display 428 to provide a touchscreen display configured to receive touch inputs for enabling interaction with a graphic interface presented on the display 428. Accordingly, implementations herein are not limited to any particular display technology. Alternatively, in some examples, the merchant computing device(s) 402 may not include the display 428, and information can be presented by other means, such as aurally.

In addition, in some examples, the merchant computing device(s) 402 may include or may be connectable to a card reader 430. In some examples, the card reader 430 may plug in to a port in the merchant computing device(s) 402, such as a microphone/headphone port, a data port, or other suitable port. The card reader 430 may include a read head for reading a magnetic strip of a payment card, and further may include encryption technology for encrypting the information read from the magnetic strip. Alternatively, numerous other types of card readers may be employed with the merchant computing device(s) 402 herein, depending on the type and configuration of the merchant computing device(s) 402.

Other components included in the merchant computing device(s) 402 may include a global-positioning system (GPS) device 432 able to indicate location information. Further, the merchant computing device(s) 402 may include one or more sensors 434, such as an accelerometer, gyroscope, compass, proximity sensor, camera, microphone, and/or a switch, as discussed above. Additionally, the merchant computing device(s) 402 may include various other components that are not shown, examples of which include removable storage, a power source, such as a battery and power control unit, a barcode scanner, a printer, a cash drawer, and so forth.

As described above, techniques described herein are directed to affecting a delay in a payroll payment and/or making a payroll payment via a service account in the case of an electronic payment failure ("covering" a failed electronic payment). In some examples, these techniques may be employed by a service provider that may be a transaction processing service. In some examples, the service provider may operate the serving computing device(s) 404. The serving computing device(s) 404 may include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the serving computing device(s) 404 as being present in a single location, these components and data may alternatively be distributed across different computing devices and different locations in any manner. Consequently, the functions may be implemented by one or more serving computing systems, with the various functionality described above distributed in various ways across the different computing devices. Multiple serving computing device(s) 404 may be located together or separately, and organized, for example, as virtual servers, server banks and/or server farms. The described functionality may be provided by the servers of a single entity or enterprise, or may be provided by the servers and/or services of multiple different customers or enterprises.

In the illustrated example, the serving computing device(s) 404 may include one or more processors 436, one or more computer-readable media 438, one or more communication interfaces 440, and one or more input/output devices 442. Each processor 436 may be a single processing unit or a number of processing units, and can include single or multiple computing units or multiple processing cores. The processor(s) 436 may be implemented as one or more microprocessors, microcomputers, microcontrollers, digital signal processors, central processing units, state machines, logic circuitries, and/or any devices that manipulate signals based at least in part on operational instructions. For example, the processor(s) 436 may be one or more hardware processors and/or logic circuits of any suitable type specifically programmed or configured to execute the algorithms and processes described herein. The processor(s) 436 may be configured to fetch and execute computer-readable instructions stored in the computer-readable media 438, which may program the processor(s) 436 to perform the functions described herein.

The computer-readable media 438 may include volatile and nonvolatile memory and/or removable and non-removable media implemented in any type of technology for storage of information, such as computer-readable instructions, data structures, program modules, or other data. Such computer-readable media 438 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the serving computing device(s) 404, the computer-readable media 438 may be a type of computer-readable storage media and/or can be a tangible non-transitory media to the extent that when mentioned, non-transitory computer-readable media exclude media such as energy, carrier signals, electromagnetic waves, and signals per se.

The computer-readable media 438 may be used to store any number of functional components that are executable by the processors 436. In many implementations, these functional components comprise instructions or programs that are executable by the processors 436 and that, when executed, specifically configure the one or more processors 436 to perform the actions attributed above to the service provider and/or transaction processing service. Functional components stored in the computer-readable media 438 may include a transaction processing module 444 (e.g., transaction processing system 104), a payroll processing module 446 (e.g., payroll processing system 106), a risk assessment/ capital loan module 448 (e.g., risk assessment/capital loan system 108), and/or a UI generation module 450. In some examples, modules 444-450 may represent SaaS.

In some examples, the risk assessment/capital loan model 448 may receive an instruction from the merchant computing device(s) 402 indicating that the merchant accepts an offer for a custom capital loan (e.g., by activating one of the interface elements discussed herein, such as a delay or cover, for example). The instruction may indicate which capital loan product the merchant accepts, which may be determined based at least in part on actuation of a mechanism at a UI and/or website presented at a device associated with the merchant. Based at least in part on receiving the instruction, the risk assessment/capital loan model 448 may initiate processing the loan. That is, the risk assessment/capital loan model 448 may send one or more requests for information to process the loan. In at least one example, the risk assessment/capital loan model 448 may send a request for an affirmation that the merchant agrees to the terms of the loan (e.g., in addition to actuating the mechanism associated with the capital offer on the user interface). Responsive to receiving an affirmation that the merchant agrees to the terms of the loan, the risk assessment/capital loan model 448 may send an instruction to transfer an amount of funds corresponding to at least a portion of the loan to an account of the merchant and/or of an employee (or may do so responsive to determining that an electronic transfer failed). In at least one example, the amount of funds may be transferred from an account of the transaction processing service to employee account(s) via an electronic funds transfer.

In some examples, the UI generation module 450 may be a service-side API for providing instructions to merchant device(s) (e.g., providing instructions for interface(s), configuring the merchant device(s) for accessing the SaaS services and/or queries). In some examples, the UI generation module 448 may determine instructions for generating a user interface at a merchant device. In some examples, the UI generation module 448 may generate and/or send the instructions to the merchant computing device(s) 402 responsive to receiving an indication that an interface element was activated at a merchant computing device(s) 402 (e.g., activating a delay and/or coverage of a failed electronic transfer). In some examples, the UI generation module 448 may send information associated with a capital loan product (and perhaps pre-approval) to the merchant computing device(s) 402 in response. For instance, the UI generation module 448 may send an electronic communication (e.g., an email, a text message, a push notification, a blockchain transaction, etc.) to an address associated with a merchant profile of a merchant. In some examples, the address may correspond to the merchant computing device(s) 402 such that the merchant computing device(s) 402 may present the communication to the merchant. In such examples, the communication may include a mechanism, the actuation of which causes an indication of interest to be sent to the serving computing device(s) 404, may cause a GUI to be displayed for modifying and/or accepting terms of the capital loan, and the like.

In additional and/or alternative examples, the UI generation module 448 may cause a notification to be presented via a dashboard presented via the merchant computing device(s) 402. For instance, the UI generation module 448 may send instructions to the dashboard module 422 to cause the dashboard module 422 to provide a notification that the merchant is qualified for delay and/or coverage. In such examples, the notification may include a mechanism, the actuation of which causes an indication that the delay and/or coverage was activated at the merchant device(s) 402 to be sent to the serving computing device(s) 404.

Additional functional components stored in the computer-readable media 438 may include an operating system 442 for controlling and managing various functions of the serving computing device(s) 404.

In at least one example, the computer-readable media 438 may include or maintain other functional components and data, such as other modules and data 544, which may include programs, drivers, etc., and the data used or generated by the functional components. Further, the serving computing device(s) 404 may include many other logical, programmatic and physical components, of which those described above are merely examples that are related to the discussion herein.

In addition, the computer-readable media 438 may store data used for performing the operations described herein. Thus, the computer-readable media 438 may store merchant profile(s) 556. In at least one example, the merchant profile(s) 556 may store information associated with individual merchant(s). For instance, a merchant profile of the merchant profile(s) 556 may store merchant data including, but not limited to, a blockchain identifier, a reconstructed wallet, blockchain transaction data, a merchant category classification (MCC), item(s) offered for sale by the merchant, external transaction data associated with transactions conducted by the merchant (e.g., via the merchant application 418), hardware (e.g., device type) used by the merchant, previous loans made to the merchant, previous defaults on said loans, an indication of risk (e.g., based at least in part on fraud, chargeback, etc.) associated with the merchant, etc. In at least one example, a merchant profile may store data derived from the transaction data. For instance, a merchant profile may store merchant data indicating a volume of transactions processed by the transaction processing service on behalf of the merchant, a frequency of transactions processed by the transaction processing service on behalf of the merchant, etc.

The communication interface(s) 440 may include one or more interfaces and hardware components for enabling communication with various other devices, such as over the network(s) 406. For example, communication interface(s) 440 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The serving computing device(s) 404 may further be equipped with various input/output (I/O) devices 442. Such I/O devices 442 may include a display, various user interface controls (e.g., buttons, joystick, keyboard, mouse, touch screen, etc.), audio speakers, connection ports and so forth.

CONCLUSION

FIGS. 2A-3D include flow diagrams illustrating example processes according to some implementations. The processes of FIGS. 2A-3D include illustrations of collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. Further, in some examples, some or all of the operations illustrated in one or more of FIGS. 2A-3D may be combined with some or all of the operations illustrated in others of FIGS. 2A-3D. For discussion purposes, the processes are described with reference to the environments, architectures and devices described in the examples herein, although the processes can be implemented in a wide variety of other environments, architectures and devices.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or can be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the techniques have been described, various alterations, additions, permutations and equivalents thereof are included within the scope of the techniques.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed:

1. A computer-implemented method for enabling an employer to provide payroll payments to employees of the employer via a payroll service, the computer-implemented method comprising:
    generating, via a trained model associated with a capital loan service, a risk score indicating a likelihood that a payroll payment from the employer to the employees will settle, the risk score based at least in part on (i) payroll data received from an instance of a payroll application executing on a computing device associated with the employer, and (ii) transaction data received from an instance of a merchant application executing on the computing device, the merchant application transmitting transaction data to a transaction processing service associated with the payroll service and the capital loan service, wherein the trained model is trained to generate the risk score using, as training data, past payroll data for a plurality of other employers received at least in part via the payroll service, and past transaction data associated with a plurality of other merchants, wherein the past transaction data includes, at least in part, information related to a plurality of transactions processed by the plurality of other merchants through the transaction processing service;
    based at least in part on the risk score generated via the trained model, providing instructions to populate, via a user interface of the payroll application, an interface element, selection of which triggers a delay of an electronic withdrawal of funds from the employer account from a first date to a second date after the first date;
    based at least in part on receiving an indication that the interface element was activated at the payroll application, initiating an electronic transfer of the funds from an employer account of the employer to employee accounts of the employees on the second date to satisfy the payroll payment;
    upon determining that the electronic transfer of the funds failed to settle, generating a capital loan for the employer, the capital loan being available via the capital loan service;
    transferring an amount of funds corresponding with the capital loan to one or more employee accounts from a service account associated with the transaction processing service in order to settle the payroll payment;
    receiving, after determining that the electronic transfer of the funds failed and via the merchant application, additional transaction data associated with transactions processed by the employer; and
    withholding a portion of funds associated with the additional transaction data to repay at least a portion of the capital loan.

2. The computer-implemented method as recited in claim 1, wherein providing the instructions to populate the interface element is at least partly responsive to determining that the risk score satisfies a threshold risk score, the threshold risk score being based at least in part on payroll data and transaction data associated with merchants in a same merchant category as the employer.

3. The computer-implemented method as recited in claim 1, wherein the risk score is based at least in part on an amount of overtime indicated by the payroll application.

4. The computer-implemented method as recited in claim 1, wherein the portion of funds withheld corresponds to a predetermined percentage of funds indicated by the additional transaction data.

5. The computer-implemented method as recited in claim 1, wherein the portion of funds withheld is based at least in part on at least one of
    a number of past failed electronic funds transfers,
    an amount of overtime due, or
    a remaining amount due for a previous capital loan.

6. The computer-implemented method as recited in claim 1, further comprising providing instructions to populate, via the user interface of the payroll application, another interface element, selection of which alters a percentage of funds indicated by the additional transaction data that is withheld, the selection being bounded between a first percentage and a second percentage determined based at least in part on the risk score.

7. A system comprising:
one or more processors;
one or more computer-readable media storing instructions executable by the one or more processors, wherein the instructions configure the one or more processors to perform operations comprising:
receiving, from a computing device executing a payroll application, payroll data specifying employment and payroll information associated with an employer, the payroll application associated with a payment service;
receiving transaction data specifying payments between one or more customers and the employer;
generating, using a trained model, a risk score based at least in part on the payroll data and the transaction data, the risk score indicating a likelihood that a payroll payment from the employer to employees will settle, the trained model having been trained using, as training data, past payroll data for a plurality of other employers received at least in part via the payroll service, and past transaction data associated with a plurality of other merchants, wherein the past transaction data includes, at least in part, information related to a plurality of transactions processed by the plurality of other merchants through the payment service; and
based at least in part on determining that the risk score satisfies a threshold, sending an instruction to cause the payroll application to present, in a user interface of the payroll application, an interface element, selection of which triggers a delay of an electronic withdrawal of funds from the employer account from a first date to a second date after the first date.

8. The system as recited in claim 7, wherein the operation of sending the instruction to cause the payroll application to present the interface element in the user interface of the payroll application is further based at least in part on determining that the electronic withdrawal of funds failed.

9. The system as recited in claim 7, the operations further comprising:
initiating the electronic withdrawal of funds on the second date based at least in part on receiving a selection of the interface element from the payroll application on or before the second date; and
activating a capital loan based at least in part on receiving an indication that the electronic withdrawal of funds failed or based at least in part on receiving the selection of the interface element from the payroll application after the second date.

10. The system as recited in claim 9, wherein based at least in part on receiving the selection and activating the capital loan, the operations further comprise:
transferring funds from a service account to employee accounts, the transferred funds being in an amount based on the electronic withdrawal of funds;
receiving subsequent transaction data from the merchant application; and
withholding a portion of funds associated with the subsequent transaction data to repay at least a portion of the capital loan.

11. The system as recited in claim 10, wherein the withheld portion of funds is a percentage of a payment amount specified by the subsequent transaction data, the percentage being based at least in part on at least one of a number of previous electronic fund transfer failures, or an amount of overtime specified by the payroll data.

12. The system as recited in claim 10, wherein the withheld portion of funds is a percentage of a payment amount specified by the subsequent transaction data, the percentage being based at least in part on a position of a slider interface element presented via a user interface of the payroll application.

13. The system as recited in claim 7, wherein the operation of sending the instruction to cause the payroll application to present the interface element in the user interface of the payroll application is further based at least in part on determining that a portion of a payroll payment failed and that the portion is less than a threshold percentage of the payroll payment or less than a threshold amount of funds.

14. A method comprising:
receiving, by one or more processors and from a computing device executing a payroll application, payroll data specifying employment and payroll information associated with an employer, the payroll application associated with a payment service;
receiving transaction data specifying payments between one or more customers and the employer;
generating, using a trained model, a risk score based at least in part on the payroll data and the transaction data, the risk score indicating a likelihood that a payroll payment from the employer to employees will settle, the trained model having been trained using, as training data, past payroll data for a plurality of other employers received at least in part via the payroll service, and past transaction data associated with a plurality of other merchants, wherein the past transaction data includes, at least in part, information related to a plurality of transactions processed by the plurality of other merchants through the payment service; and
based at least in part on determining that the risk score satisfies a threshold, sending an instruction to cause the payroll application to present, in a user interface of the payroll application, an interface element, selection of which triggers a delay of an electronic withdrawal of funds from the employer account from a first date to a second date after the first date.

15. The method as recited in claim 14, wherein sending the instruction to cause the payroll application to present the interface element in the user interface of the payroll application is further based at least in part on determining that the electronic withdrawal of funds failed.

16. The method as recited in claim 14, further comprising:
initiating the electronic withdrawal of funds on the second date based at least in part on receiving a selection of the interface element from the payroll application on or before the second date; and
activating a capital loan based at least in part on receiving an indication that the electronic withdrawal of funds failed or based at least in part on receiving the selection of the interface element from the payroll application after the second date.

17. The method as recited in claim 16, wherein based at least in part on receiving the selection and activating the capital loan, the method further comprises:
transferring funds from a service account to employee accounts, the transferred funds being in an amount based on the electronic withdrawal of funds;
receiving subsequent transaction data from the merchant application; and
withholding a portion of funds associated with the subsequent transaction data to repay at least a portion of the capital loan.

18. The method as recited in claim 17, wherein the withheld portion of funds is a percentage of a payment amount specified by the subsequent transaction data, the percentage being based at least in part on at least one of a number of previous electronic fund transfer failures, or an amount of overtime specified by the payroll data.

19. The method as recited in claim 17, wherein the withheld portion of funds is a percentage of a payment amount specified by the subsequent transaction data, the percentage being based at least in part on a position of a slider interface element presented via a user interface of the payroll application.

20. The method as recited in claim 14, wherein the operation of sending the instruction to cause the payroll application to present the interface element in the user interface of the payroll application is further based at least in part on determining that a portion of a payroll payment failed and that the portion is less than a threshold percentage of the payroll payment or less than a threshold amount of funds.

\* \* \* \* \*